(12) United States Patent
Qi et al.

(10) Patent No.: US 11,335,358 B2
(45) Date of Patent: May 17, 2022

(54) SIGNAL PROCESSING DEVICE HAVING MULTIPLE ACOUSTIC-ELECTRIC TRANSDUCERS

(71) Applicant: SHENZHEN SHOKZ CO., LTD., Guangdong (CN)

(72) Inventors: Xin Qi, Shenzhen (CN); Lei Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 16/822,151

(22) Filed: Mar. 18, 2020

(65) Prior Publication Data
US 2020/0219526 A1    Jul. 9, 2020

Related U.S. Application Data

(63) Continuation of application No. PCT/CN2018/105161, filed on Sep. 12, 2018.

(51) Int. Cl.
*G10L 25/18* (2013.01)
*G10L 25/51* (2013.01)
(Continued)

(52) U.S. Cl.
CPC .............. *G10L 25/18* (2013.01); *G10L 25/51* (2013.01); *H04R 1/403* (2013.01); *H04R 3/02* (2013.01);
(Continued)

(58) Field of Classification Search
CPC ........ H04R 29/006; H04R 3/00; H04R 1/245; H04R 2201/403; H04R 2203/12;
(Continued)

(56) References Cited

U.S. PATENT DOCUMENTS 4,485,374 A    11/1984  Meserow et al.
4,817,413 A    4/1989   Asano et al.
(Continued)

FOREIGN PATENT DOCUMENTS

CN    1215510 A  *  4/1999  ............. G10L 19/02
CN    1123863 C      10/2003
(Continued)

OTHER PUBLICATIONS

International Search Report in PCT/CN2018/105161 dated Jun. 13, 2019, 6 pages.
(Continued)

*Primary Examiner* — Lun-See Lao
(74) *Attorney, Agent, or Firm* — Metis IP LLC

(57) ABSTRACT

The present disclosure relates to a device for processing an audio signal. The device may include a first acoustic-electric transducer and a second acoustic-electric transducer. The first acoustic-electric transducer may have a first frequency response, and may be configured to detect the audio signal and generate a first sub-band signal according to the detected audio signal. The second acoustic-electric transducer may have a second frequency response, the second frequency response being different from the first frequency response. The second acoustic-electric transducer may be configured to detect the audio signal and generate a second sub-band signal according to the detected audio signal.

20 Claims, 44 Drawing Sheets

(51) Int. Cl.
  *H04R 1/40* (2006.01)
  *H04R 3/02* (2006.01)
  *H04R 3/04* (2006.01)
  *H04R 3/12* (2006.01)
  *H04R 29/00* (2006.01)

(52) U.S. Cl.
  CPC ............. *H04R 3/04* (2013.01); *H04R 3/12* (2013.01); *H04R 29/002* (2013.01)

(58) Field of Classification Search
  CPC .. H04R 2225/43; H04R 25/30; H04R 25/505; H04R 25/554; H04R 27/00; H04R 29/005; G10L 2021/02166; G10L 19/00; G10L 19/008; G10L 2021/02082; G10L 21/0208; G10L 21/0216; G10L 21/0264; G10L 2021/02165; G10L 21/0232; G10L 19/0204; G10L 2021/02087; G10L 21/02; G10L 25/03; G10L 25/78; G10L 25/90; G10L 19/0208; G10L 2021/02168; G10L 21/003; G10L 21/0224; G10L 21/06; G10L 25/18; G10L 25/48; G10L 25/51; G10K 11/17854; G10K 11/17885; G10K 11/17823; G10K 11/17827; G10K 11/17857; G10K 11/17881; G10K 2210/1081; G10K 11/16; G10K 11/175; G10K 11/17817; G10K 11/17825; G10K 11/1783; G10K 11/17837; G10K 11/17855; G10K 11/17875; G10K 2210/1053; G10K 2210/108; G10K 2210/1282; G10K 2210/3014; G10K 2210/30232; G10K 2210/3025; G10K 2210/505; G10K 2210/506; G10K 2210/51; H04S 3/006; H04S 7/00; H04S 7/30; H04S 2400/03; H04S 2400/15; H04S 7/303; H04S 2400/11; H04M 3/56; H04M 9/08; H04M 9/082; H04M 1/6033; H04M 1/68; H04K 1/02; H04K 1/10; H04K 2203/12; H04K 2203/32; H04K 3/42; H04K 3/825
  USPC .............. 381/56–59, 16–18, 1, 92
  See application file for complete search history.

(56) References Cited

U.S. PATENT DOCUMENTS

| | | | |
|---|---|---|---|
| 6,449,596 B1 | 9/2002 | Ejima | |
| 7,146,014 B2 | 12/2006 | Hannah | |
| 7,283,967 B2* | 10/2007 | Nishio | G10L 19/0208 704/205 |
| 7,676,372 B1 | 3/2010 | Oba | |
| 7,775,113 B2 | 8/2010 | Bakish | |
| 8,571,227 B2 | 10/2013 | Donaldson et al. | |
| 8,825,149 B2 | 9/2014 | Kraus et al. | |
| 9,084,048 B1 | 7/2015 | Gottlieb | |
| 9,269,352 B2 | 2/2016 | Talwar et al. | |
| 9,311,928 B1 | 4/2016 | Avargel et al. | |
| 9,344,811 B2 | 5/2016 | Bakish | |
| 9,443,510 B2 | 9/2016 | Jung | |
| 9,479,884 B2* | 10/2016 | Kim | H04R 7/08 |
| 9,536,523 B2 | 1/2017 | Bakish et al. | |
| 9,654,856 B1 | 5/2017 | Horbach | |
| 9,666,191 B1 | 5/2017 | Bakish | |
| 2001/0024508 A1* | 9/2001 | Croft, III | H04R 1/2842 381/345 |
| 2008/0312921 A1 | 12/2008 | Axelrod et al. | |
| 2009/0226004 A1* | 9/2009 | Sorensen | H04R 3/005 381/92 |
| 2009/0319279 A1 | 12/2009 | Kong et al. | |
| 2010/0094631 A1 | 4/2010 | Engdegard et al. | |
| 2012/0243715 A1 | 9/2012 | Pedersen | |
| 2013/0315402 A1* | 11/2013 | Visser | G10L 19/00 381/18 |
| 2014/0286504 A1 | 9/2014 | Iwai et al. | |
| 2015/0063591 A1 | 3/2015 | Hu et al. | |
| 2015/0281865 A1 | 10/2015 | Gottlieb | |
| 2016/0063986 A1 | 3/2016 | Ben-Ami et al. | |
| 2016/0282259 A1 | 9/2016 | Kolb et al. | |
| 2017/0006385 A1 | 1/2017 | Kim | |
| 2018/0227692 A1 | 8/2018 | Lee et al. | |
| 2019/0103088 A1* | 4/2019 | Zheng | H04R 1/40 |
| 2019/0323947 A1 | 10/2019 | Kolb et al. | |

FOREIGN PATENT DOCUMENTS

| | | |
|---|---|---|
| CN | 101227763 A | 7/2008 |
| CN | 101276587 A | 10/2008 |
| CN | 101345050 A | 1/2009 |
| CN | 102737646 A | 10/2012 |
| CN | 202940957 U | 5/2013 |
| CN | 104050965 A | 9/2014 |
| CN | 104602162 A | 5/2015 |
| CN | 204993766 U | 1/2016 |
| EP | 2653646 A1 | 10/2013 |
| WO | 2009042385 A1 | 4/2009 |

OTHER PUBLICATIONS

Written Opinion in PCT/CN2018/105161 dated Jun. 13, 2019, 4 pages.
The Extended European Search Report in European Application No. 18933628.2 dated Jul. 28, 2021, 8 pages.
Official Action in Russian Application No. 2021106260 dated Nov. 17, 2021, 14 pages.

* cited by examiner

420

SIGNAL PROCESSING DEVICE HAVING MULTIPLE ACOUSTIC-ELECTRIC TRANSDUCERS

CROSS-REFERENCE TO RELATED APPLICATIONS

The present application is a continuation of International Application No. PCT/CN2018/105161 filed on Sep. 12, 2018, the entire contents of which are hereby incorporated by reference.

TECHNICAL FIELD

The present disclosure generally relates to signal processing, particularly to methods and devices for generating sub-band signals according to audio signals.

BACKGROUND

Sub-band decomposition technique is widely used in signal processing areas such as speech recognition, noise reduction, or signal enhancement, image encoding, or the like, or a combination thereof. An audio signal detected by an acoustic-electric transducer may be further processed to generate a digital signal, based on which a plurality of sub-band signals may further be generated. Generating sub-band signals from a digital signal may be time-consuming due to the computing process involved. Thus, it is desirable to provide a method and device to process an audio signal to generate sub-band signals in a more efficient way.

SUMMARY

The present disclosure relates to a device for processing an audio signal. The device may include a first acoustic-electric transducer and a second acoustic-electric transducer. The first acoustic-electric transducer may have a first frequency response, and may be configured to detect the audio signal and generate a first sub-band signal according to the detected audio signal. The second acoustic-electric transducer may have a second frequency response, the second frequency response being different from the first frequency response. The second acoustic-electric transducer may be configured to detect the audio signal and generate a second sub-band signal according to the detected audio signal.

In some embodiments, the first acoustic-electric transducer has a first frequency width, and the second acoustic-electric transducer has a second frequency width different from the first frequency width.

In some embodiments, the second frequency width may be larger than the first frequency width, and a second center frequency of the second acoustic-electric transducer may be higher than a first center frequency of the first acoustic-electric transducer.

In some embodiments, the device may further include a third acoustic-electric transducer. A third center frequency of the third acoustic-electric transducer may be higher than the second center frequency of the second acoustic-electric transducer.

In some embodiments, the first frequency response and the second frequency response intersect at a point which may be near a half-power point of the first frequency response and a half-power point of the second frequency response.

In some embodiments, the first frequency response and the second frequency response intersect at a point which may be near a half-power point of the first frequency response and a half-power point of the second frequency response.

In some embodiments, the device may further include a first sampling module connected to the first acoustic-electric transducer and configured to sample the first sub-band signal to generate a first sampled sub-band signal, and a second sampling module connected to the second acoustic-electric transducer and configured to sample the second sub-band signal to generate a second sampled sub-band signal.

In some embodiments, at least one of the first sampling module or the second sampling module may be a bandpass sampling module.

In some embodiments, the device may further include a feedback module configured to adjust at least one of the first acoustic-electric transducer or the second acoustic-electric transducer.

In some embodiments, the feedback module may be configured to adjust the at least one of the first acoustic-electric transducer or the second acoustic-electric transducer according to at least one of the first sampled sub-band signal or the second sampled sub-band signal.

In some embodiments, the device may further include a processing module configured to respectively process the first sampled sub-band signal and the second sampled sub-band signal to generate a first processed sub-band signal and a second processed sub-band signal, wherein the feedback module may be configured to adjust the at least one of the first acoustic-electric transducer or the second acoustic-electric transducer according to the first processed sub-band signal or the second processed sub-band signal.

In some embodiments, the first acoustic-electric transducer may include a sound sensitive component that is configured to generate an electric signal according to the audio signal, and an acoustic channel component.

In some embodiments, the acoustic channel component may include a second-order component, and the sound sensitive component may include a multi-order bandpass diaphragm.

In some embodiments, the multi-order bandpass diaphragm may include a second-order bandpass diaphragm.

In some embodiments, the acoustic channel component may include a second-order bandpass cantilever.

In some embodiments, the second-order bandpass cantilever may include a piezoelectric cantilever.

In some embodiments, the first acoustic-electric transducer may include a first-order bandpass filter.

In some embodiments, the first acoustic-electric transducer may include a multi-order bandpass filter.

In some embodiments, the multi-order bandpass filter may include a second-order bandpass filter, a fourth-order bandpass filter, or a sixth-order bandpass filter.

In some embodiments, the first acoustic-electric transducer may include a Gamatone filter.

In some embodiments, the device may include no more than 10 first-order acoustic-electric transducers, wherein each first-order acoustic-electric transducer corresponds to a frequency band whose width may be no larger than 20 kHz.

In some embodiments, the device may include no more than 20 second-order acoustic-electric transducers, wherein each second-order acoustic-electric transducer corresponds to a frequency band whose width may be no larger than 20 kHz.

In some embodiments, the device may include no more than 30 third-order acoustic-electric transducers, wherein each third-order acoustic-electric transducer corresponds to a frequency band whose width may be no larger than 20 kHz.

In some embodiments, the device may include no more than 40 fourth-order acoustic-electric transducers, wherein each fourth-order acoustic-electric transducer corresponds to a frequency band whose width may be no larger than 20 kHz.

In some embodiments, the device may include no more than 8 first-order acoustic-electric transducers, wherein each first-order acoustic-electric transducer corresponds to a frequency band whose width may be no larger than 8 kHz.

In some embodiments, the device may include no more than 13 second-order acoustic-electric transducers, wherein each second-order acoustic-electric transducer corresponds to a frequency band whose width may be no larger than 8 kHz.

In some embodiments, the device may include no more than 19 third-order acoustic-electric transducers, wherein each third-order acoustic-electric transducer corresponds to a frequency band whose width may be no larger than 8 kHz.

In some embodiments, the device may include no more than 26 fourth-order acoustic-electric transducers, wherein each fourth-order acoustic-electric transducer corresponds to a frequency band whose width may be no larger than 8 kHz.

In some embodiments, the device may include no more than 4 first-order acoustic-electric transducers, wherein each first-order acoustic-electric transducer corresponds to a frequency band whose width may be no larger than 4 kHz.

In some embodiments, the device may include no more than 8 second-order acoustic-electric transducers, wherein each second-order acoustic-electric transducer corresponds to a frequency band whose width may be no larger than 4 kHz.

In some embodiments, the device may include no more than 12 third-order acoustic-electric transducers, wherein each third-order acoustic-electric transducer corresponds to a frequency band whose width may be no larger than 4 kHz.

In some embodiments, the device may include no more than 15 fourth-order acoustic-electric transducers, wherein each fourth-order acoustic-electric transducer corresponds to a frequency band whose width may be no larger than 4 kHz.

In some embodiments, the first acoustic-electric transducer may be an air-conduction acoustic-electric transducer, and the second acoustic-electric transducer may be a bone-conduction acoustic-electric transducer.

In some embodiments, the first acoustic-electric transducer may be a high-order wideband acoustic-electric transducer, and the second acoustic-electric transducer may be a high-order narrow-band acoustic-electric transducer.

In some embodiments, the high-order wideband acoustic-electric transducer may include a plurality of underdamping sound sensitive components connected in parallel.

In some embodiments, the plurality of underdamping sound sensitive components include a first underdamping sound sensitive component having a fourth frequency response, a second underdamping sound sensitive component having a fifth frequency response, and a third underdamping sound sensitive component having a sixth frequency response. A fifth center frequency of the second underdamping sound sensitive component may be higher than a fourth center frequency of the first underdamping sound sensitive, and a sixth center frequency of the third underdamping sound sensitive component may be higher than the fifth center frequency of the second underdamping sound sensitive. The fourth frequency response and the fifth frequency response intersect at a point which may be near a half-power point of the fourth frequency response and a half-power point of the fifth frequency response.

In some embodiments, the plurality of underdamping sound sensitive components include a first underdamping sound sensitive component having a fourth frequency response, and a second underdamping sound sensitive component having a fifth frequency response. The fourth frequency response and the fifth frequency response intersect at a point which may be near a half-power point of the fourth frequency response and a half-power point of the fifth frequency response.

In some embodiments, the high-order narrow-band acoustic-electric transducer may include a plurality of underdamping sound sensitive components connected in series.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
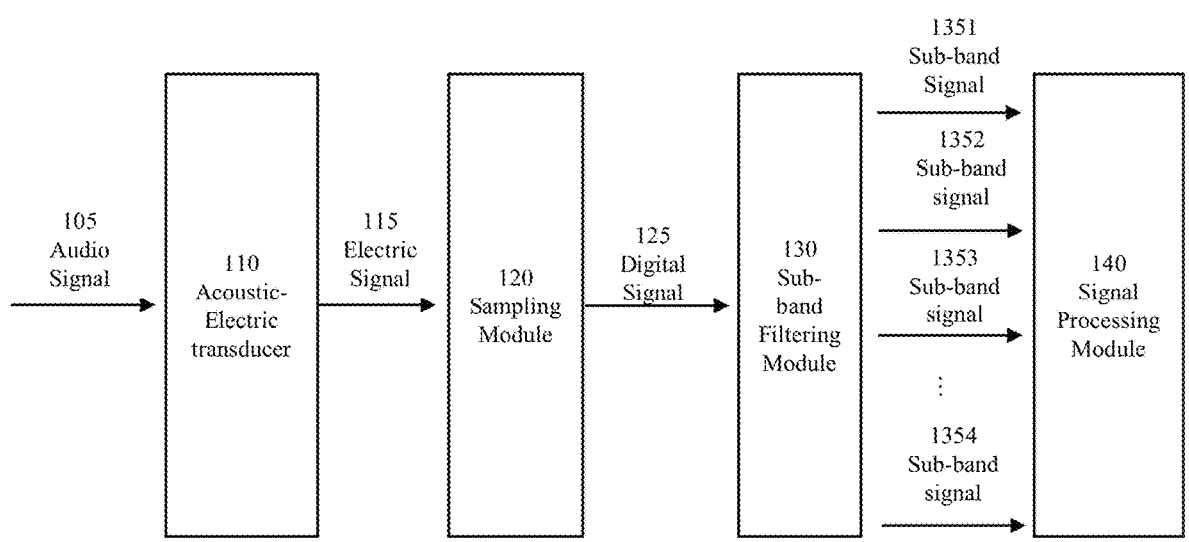
FIG. 1 illustrates a prior art signal processing device.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure. However, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for the purpose of illustration and description only and are not intended to limit the scope of the present disclosure. It is understood that the drawings are not to scale.

Technical solutions of the embodiments of the present disclosure are described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

Provided herein is a device including a plurality of acoustic-transducers that have different frequency responses. The acoustic-transducers may detect an audio signal and generate a plurality of sub-band signals accordingly. The device uses inherent properties of the acoustic-transducers to generate the sub-band signals, which spares the processing of digital signals and is thus time-saving.

FIG. 1 illustrates a prior art signal processing device. The prior art signal processing device 100 may include an acoustic-electric transducer 110, a sampling module 120, a sub-band filtering module 130, and a signal processing module 140. An audio signal 105 may be first converted into an electric signal 115 by the acoustic-electric transducer 110. The sampling module 120 may convert the electric signal 115 into a digital signal 125 for processing. The sub-band filtering module 130 may decompose the digital signal 125 into a plurality of sub-band signals (e.g., sub-band signals 1351, 1352, 1353, . . . , 1354). The signal processing module 140 may further process the sub-band signals.

In one respect, to sample an electric signal 115 with a wider bandwidth, the sampling module 120 may request a higher sampling frequency. In another respect, to generate a plurality of sub-band signals, filter circuits of the sub-band filtering module 130 need to be relatively complex and have a relatively high order. Also, to generate a plurality of sub-band signals, the sub-band filtering module 130 may perform a digital signal processing process through a software program, which may be time-consuming and may introduce noise during the digital signal processing process. Thus, there is need to provide a system and method to generate sub-band signals.

Figure 2:
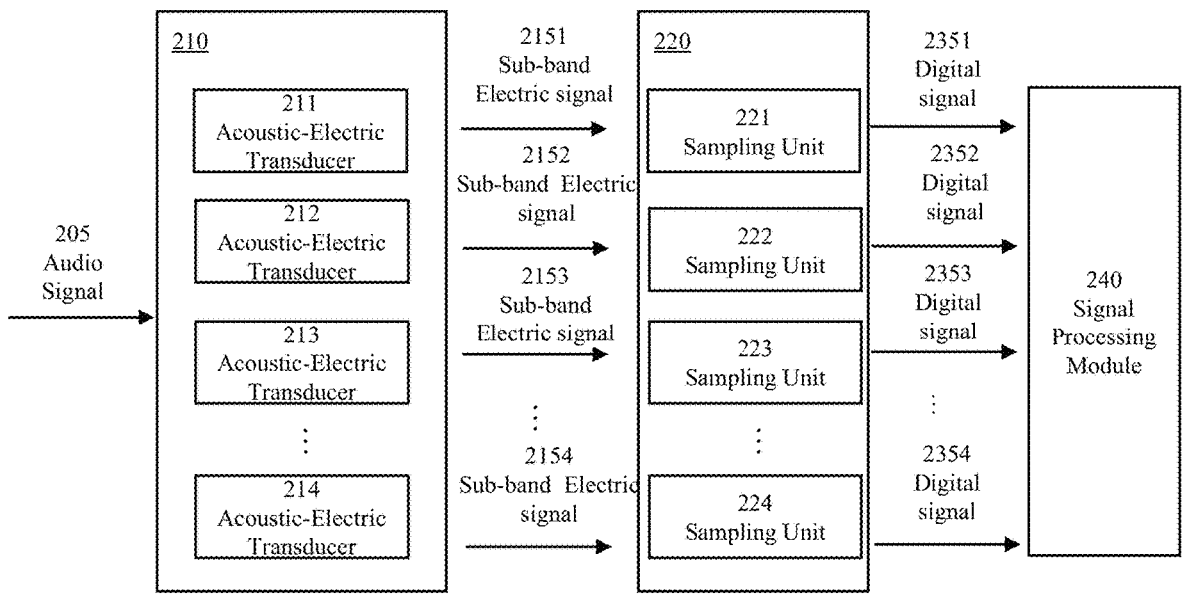
FIG. 2 illustrates an exemplary signal processing device according to some embodiments of the present disclosure.

FIG. 2 illustrates an exemplary signal processing device 200 according to some embodiments of the present disclosure. As shown in FIG. 2, the signal processing device 200 may include an acoustic-electric transducing module 210, a sampling module 220, and a signal processing module 240.

The acoustic-electric transducing module 210 may include a plurality of acoustic-electric transducers (e.g., acoustic-electric transducers 211, 212, 213, . . . , 214 illustrated in FIG. 2). The acoustic-electric transducers may be connected in parallel. For example, the acoustic-electric transducers may be connected electrically in parallel. As another example, the acoustic-electric transducers may be connected topologically in parallel.

An acoustic-electric transducer (e.g., acoustic-electric transducer 211, 212, 213, and/or 214) of the acoustic-electric transducing module 210 may be configure to convert audio signals into electric signals. In some embodiments, one or more parameters of the acoustic-electric transducer 211 may change in response to the detection of an audio signal (e.g., the audio signal 205). Exemplary parameters may include capacitance, charge, acceleration, light intensity, or the like, or a combination thereof. In some embodiments, the changes in one or more parameters may correspond to the frequency of the audio signal and may be converted to corresponding electric signals. In some embodiments, an acoustic-electric transducer of the acoustic-electric transducing module 210 may be a microphone, a hydrophone, an acoustic-optical modulator, or the like, or a combination thereof.

In some embodiments, the acoustic-electric transducer may be a first-order acoustic-electric transducer or a multi-order (e.g., second-order, fourth-order, sixth-order, etc.) acoustic-electric transducer. In some embodiments, the frequency response of a high-order acoustic-electric transducer may have a steeper edge.

In some embodiments, the acoustic-electric transducers in the acoustic-electric transducing module 210 may include one or more piezoelectric acoustic-electric transducers (e.g., a microphone) and/or one or more piezo-magnetic acoustic-electric transducers. Merely by way of example, each of the acoustic-electric transducers may be a microphone. In some embodiments, the acoustic-electric transducers may include one or more air-conduction acoustic-electric transducers and/or one or more bone-conduction acoustic-electric transducers. In some embodiments, the plurality of acoustic-electric transducers may include one or more high-order wideband acoustic-electric transducers and/or one or more high-order narrow-band acoustic-electric transducers. As used herein, a high-order wideband acoustic-electric transducer may refer to a wideband acoustic-electric transducer having an order larger than 1. As used herein, a high-order narrow-band acoustic-electric transducer may refer to a narrow-band acoustic-electric transducer having an order larger than 1. Detailed descriptions of a wideband acoustic-electric transducer and/or a narrow-band acoustic-electric transducer may be apparent to those in the art, and may not be repeated herein.

Figure 11A:
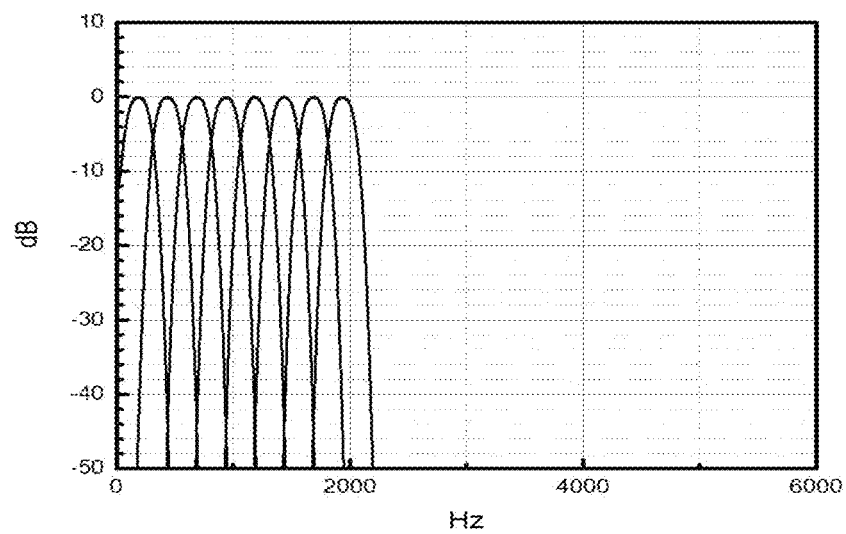
FIG. 11A illustrates an exemplary frequency response of an acoustic-electric transducing module according to some embodiments of the present disclosure.
Figure 11B:
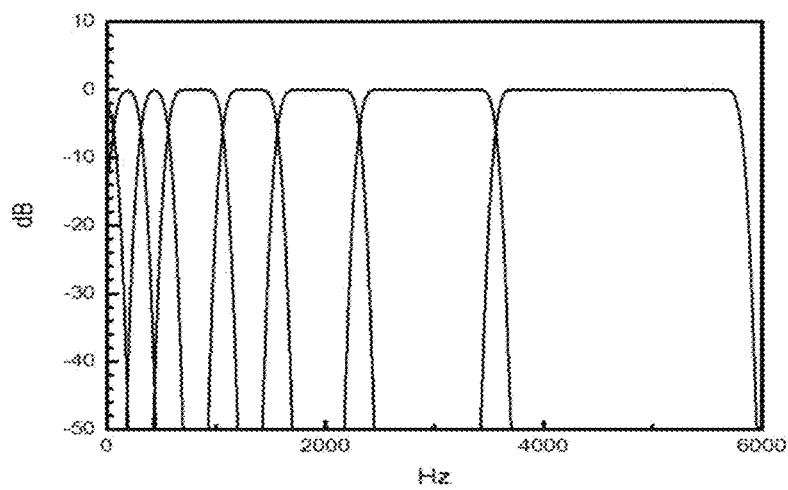
FIG. 11B illustrates an exemplary frequency response of an acoustic-electric transducing module according to some embodiments of the present disclosure.

In some embodiments, at least two of the plurality of acoustic-electric transducers may have different frequency responses, which may have different center frequencies and/or frequency bandwidths (or referred to as frequency width). For example, the acoustic-electric transducers 211, 212, 213, and 214 may have a first frequency response, a second frequency response, a third frequency response, and a fourth frequency response, respectively. In some embodiments, the first frequency response, the second frequency response, the third frequency response, and the third frequency response may be different from each other. Alternatively, the first frequency response, the second frequency response, and the third frequency response may be different from each other, while the fourth frequency response may be the same as the third frequency response. In some embodiments, the acoustic-electric transducers in an acoustic-electric transducing module 210 may have same frequency bandwidth (as illustrated in FIG. 11A and the descriptions thereof) or different frequency bandwidths (as illustrated in FIG. 11B and the descriptions thereof). FIG. 11A illustrates the frequency response of an exemplary acoustic-electric transducing module (or referred to as a first acoustic-electric transducing module). FIG. 11B illustrates the frequency response of another exemplary acoustic-electric transducing module (or referred to as a second acoustic-electric transducing module) different from the frequency response of the acoustic-electric transducing module shown in FIG. 11A. As illustrated in FIG. 11A and FIG. 11B, the first acoustic-electric transducing module or the second acoustic-electric transducing module may include 8 acoustic-electric transducers. In some embodiments, the overlap ranges between frequency responses of the acoustic-electric transducers may be adjusted by adjusting structure parameters of the acoustic-electric transducers to change the center frequency and/or the bandwidth of one or more of these acoustic-electric transducers. In some embodiments, the first acoustic-electric transducing module or the second acoustic-electric transducing module may include certain number of acoustic-electric transducers such that the frequency bands of the sub-band signals generated by the acoustic-electric transducers may cover the frequency band to be processed. In some embodiments, acoustic-electric transducers in the second acoustic-electric transducing module may have different center frequencies. In some embodiments, at least one acoustic-electric transducer with a narrow frequency bandwidth may be set to generate sub-band signals of a certain frequency band. In some embodiments, the acoustic-electric transducer with a higher center frequency response may be set to have a higher frequency bandwidth.

In some embodiments, an acoustic-electric transducer that has a center frequency higher than that of another acoustic-electric transducer may have a larger frequency bandwidth than that of the another acoustic-electric transducer.

The acoustic-electric transducers in the acoustic-electric transducing module 210 may detect an audio signal 205. The audio signal 205 may be from an acoustic source capable of generating an audio signal. The acoustic source may be a living object such as a user of the signal processing device 200 and/or a non-living object such as a CD player, a television, or the like, or a combination thereof. In some embodiments, the audio signal may also include ambient sound. The audio signal 205 may have a certain frequency band. For example, the audio signal 205 generated by the user of the signal processing device 200 may have a frequency band of 10-30,000 HZ. The acoustic-electric transducers may generate, according to the audio signal 205, a plurality of sub-band electric signals (e.g., sub-band electric signals 2151, 2152, 2153, . . . , and 2154 illustrated in FIG. 2). A sub-band electric signal generated according to the audio signal 205 refers to the signal having a frequency band narrower than the frequency band of the audio signal 205. The frequency band of the sub-band signal may be within the frequency band of the corresponding audio signal 205. For example, the audio signal 205 may have a frequency band of 10-30,000 HZ, and the frequency band of the sub-band audio signal may be 100-200 HZ, which is within the frequency band of the audio signal 205, i.e., 10-30,000 HZ. In some embodiments, an acoustic-electric transducer may detect the audio signal 205 and generate one sub-band signal according to the audio signal detected. For example, the acoustic-electric transducers 211, 212, 213, and 214 may detect the audio signal 205 and generate a sub-band electric signal 2151, a sub-band electric signal 2152, a sub-band electric signal 2153, and a sub-band electric signal 2154, respectively, according to their respectively detected audio signal. In some embodiments, at least two of the plurality of sub-band signals generated by the acoustic-electric transducers may have different frequency bands. As illustrated above, at least two of the acoustic-electric transducers may have different frequency responses, which may result in two different sub-band signals according to the detections of the same audio signal 205 by two different acoustic-electric transducers. The acoustic-electric transducing module 210 may transmit the generated sub-band signals to the sampling module 220. The acoustic-electric transducing module 210 may transmit the sub-band signals through one or more transmitters (not shown). Exemplary transmitter may be a coaxial cable, a communication cable (e.g., a telecommunication cable), a flexible cable, a spiral cable, a non-metallic sheath cable, a metal sheath cable, a multi-core cable, a twisted-pair cable, a ribbon cable, a shielded cable, a double-strand cable, an optical fiber, or the like, or a combination thereof. In some embodiments, the sub-band signals may be transmitted to the sampling module 220 via a signal transmitter. In some embodiments, the sub-band signals may be transmitted to the sampling module 220 via a plurality of sub-band transmitters connected in parallel. Each of the plurality of sub-band transmitters may connect to an acoustic-electric transducer in the acoustic-electric transducing module 210 and transmit the sub-band signal generated by the acoustic-electric transducer to the sampling module 220. For example, the sub-band transmitters may include a first sub-band transmitter connected to the acoustic-electric transducer 211 and a second sub-band transmitter connected to the acoustic-electric transducer 212. The first sub-band transmitter and the second sub-band transmitter may be connected in parallel. The first sub-band transmitter and the second sub-band transmitter may transmit the sub-band electric signal 2151 and the sub-band electric signal 2152 to the sampling module 220, respectively.

Figure 10A:
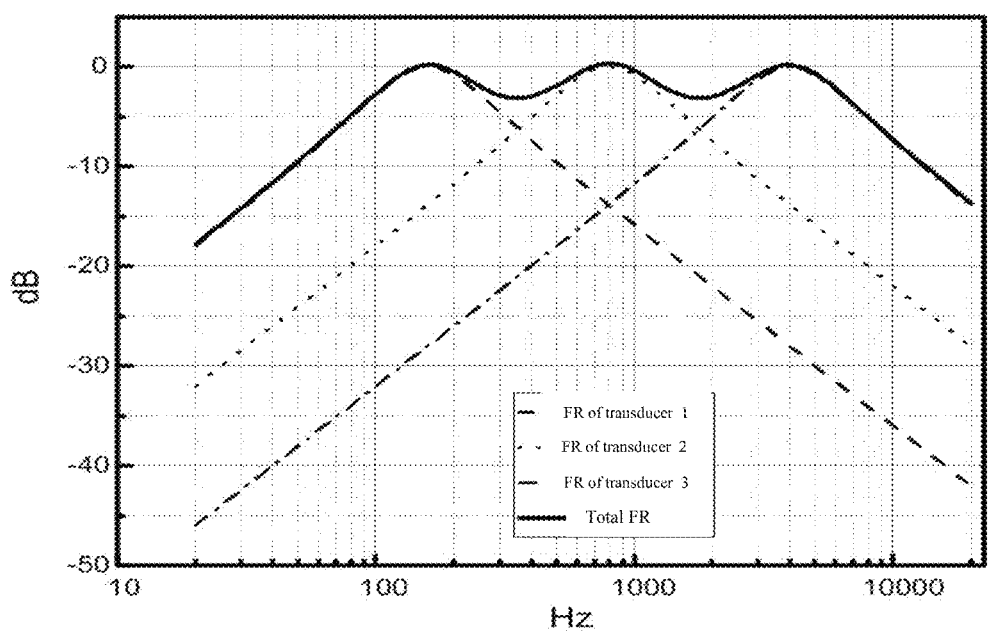
FIG. 10A illustrates an exemplary frequency response of an acoustic-electric transducing module according to some embodiments of the present disclosure.
Figure 10B:
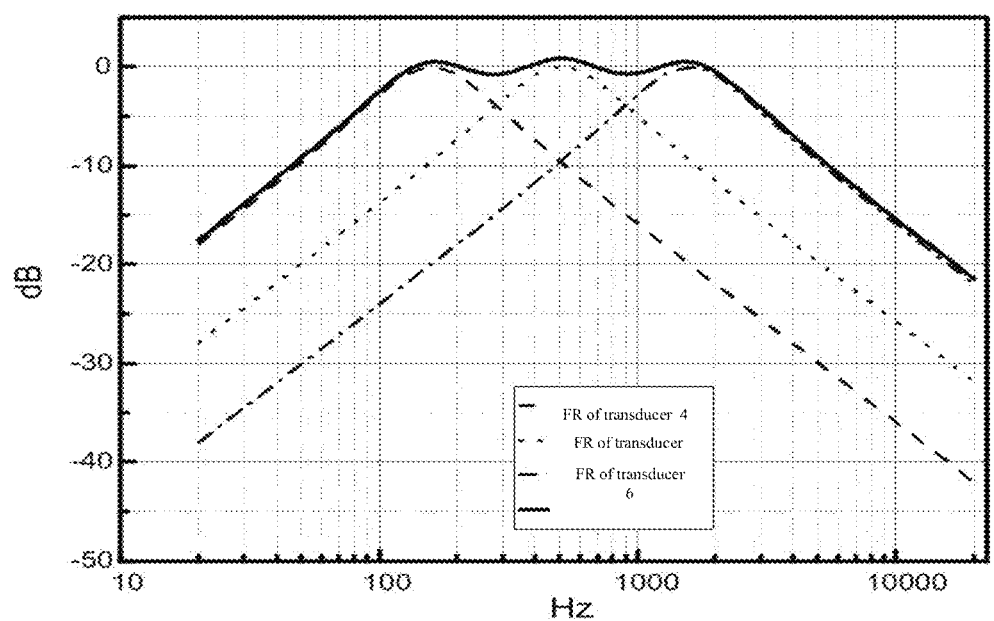
FIG. 10B illustrates an exemplary frequency response of an acoustic-electric transducing module according to some embodiments of the present disclosure.
Figure 10C:
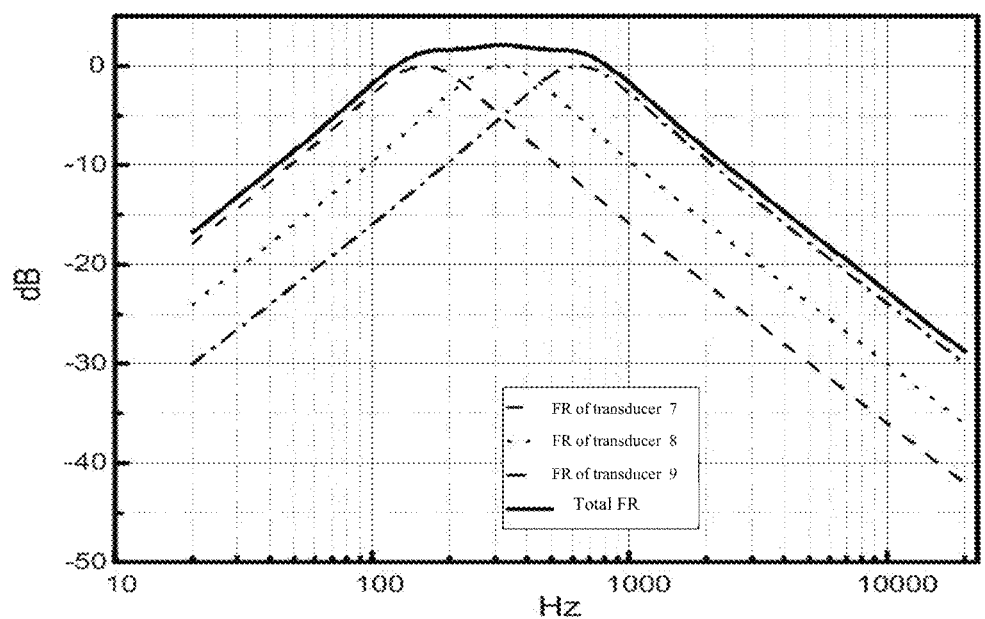
FIG. 10C illustrates an exemplary frequency response of an acoustic-electric transducing module according to some embodiments of the present disclosure.

The frequency response of an acoustic-electric transducing module 210 may depend on the frequency responses of the acoustic-electric transducers included in the acoustic-electric transducing module 210. For example, the flatness of the frequency response of an acoustic-electric transducing module 210 may be related to where the frequency response of the acoustic-electric transducers in the acoustic-electric transducing module 210 intersect with each other. As illustrated in FIGS. 10A-10C (and the descriptions thereof below), when the frequency responses of acoustic-electric transducers intersect near or at the half-power point(s), the frequency response of the acoustic-electric transducing module 210 that includes the acoustic-electric transducers may be flatter than that of the acoustic-electric transducing module 210 when the acoustic-electric transducers therein do not intersect near nor at the half-power point(s). As used herein, the half power point of a certain frequency response refers to frequency point(s) with a power level of −3 dB. As used herein, two frequency responses may be considered to intersect near a half-power point when they intersect at a frequency point that is near the half-power point. As used herein, a frequency point may be considered to be near a half-power point when the power level difference between the frequency point and the half-power point is no larger than 2 dB. In some embodiments, when the frequency response of the acoustic-electric transducers in the acoustic-electric transducing module 210 intersect with each other at a frequency point (e.g., a one-quarter-power point, or a one-eighths-power point, etc.) with a power level which is more than 2 dB lower than that of the half-power point, the overlap range between frequency responses of adjacent acoustic-electric transducers may be relatively small, causing the frequency response of a combination of the adjacent acoustic-electric transducers to decrease within the overlap range, thus affecting the quality of the sub-band signals output by the adjacent acoustic-electric transducers. In some embodiments, when the frequency response of the acoustic-electric transducers in the acoustic-electric transducing module 210 intersect with each other at a frequency point (e.g., a three-quarters-power point, or a seven-eighths-power point, etc.) with a power level 1 dB higher than the half-power point, the overlap range between frequency responses of adjacent acoustic-electric transducers may be relatively high, causing a relatively high interference range between the sub-band signals output by the acoustic-electric transducers.

Figure 13A:
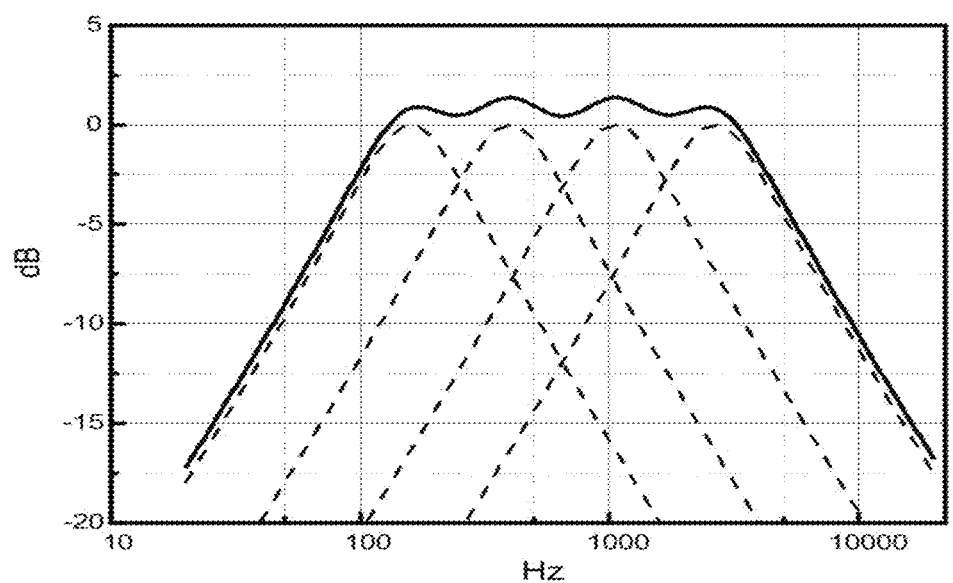
FIG. 13A illustrates an exemplary frequency response of an acoustic-electric transducing module according to some embodiments of the present disclosure.
Figure 13B:
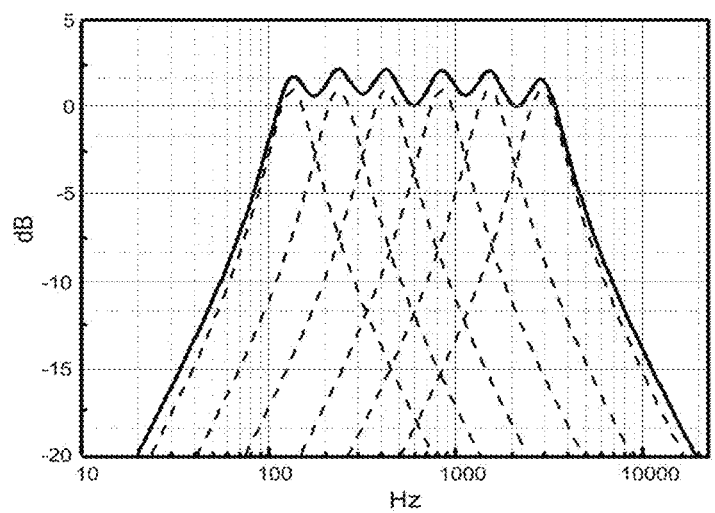
FIG. 13B illustrates an exemplary frequency response of an acoustic-electric transducing module according to some embodiments of the present disclosure.

In some embodiments, for a certain frequency band, a limited number of acoustic-electric transducers may be allowed in an acoustic-electric transducing module 210. More acoustic-electric transducers may be included in an acoustic-electric transducing module 210 when the acoustic-electric transducers are under-damped ones rather than non-underdamping ones. Merely by way of example, FIG. 13A illustrates the frequency response of the acoustic-electric transducing module 210 that includes four (the four dashed lines being the frequency responses of the four individual non-underdamping acoustic-electric transducers if they operate separately; and the solid line being the frequency response of the combination of the four non-underdamping acoustic-electric transducers). In some embodiments, more acoustic-electric transducers may be allowed to be in the acoustic-electric transducing module 210, when one or more of the acoustic-electric transducers are in under-damped state. For example, the acoustic-electric transducing module 210 may include six or more under-damped acoustic-electric transducers. Merely by way of example, FIG. 13B illustrates the frequency response of the acoustic-electric transducing module 210 having six under-damped acoustic-electric transducers.

The sampling module 220 may include a plurality of sampling units (e.g., sampling units 221, 222, 223, . . . , and 224 illustrated in FIG. 2). The sampling units may be connected in parallel.

A sampling unit (e.g., the sampling unit 221, the sampling unit 222, the sampling unit 223, and/or the sampling unit 224) in the sampling module 220 may communicate with an acoustic-electric transducer and be configured to receive and sample the sub-band signal generated by the acoustic-electric transducer. The sampling unit may communicate with the acoustic-electric transducer via a sub-band transmitter. Merely by way of example, the sampling unit 221 may be connected to the first sub-band transmitter and configured to sample the sub-band electric signal 2151 received therefrom, while the sampling unit 222 may be connected to second sub-band transmitter and configured to sample the sub-band electric signal 2152 received therefrom.

In some embodiments, a sampling unit (e.g., sampling unit 221, sampling unit 222, sampling unit 223, and/or sampling unit 224) in the sampling module may sample the sub-band signal received and generate a digital signal based on the sampled sub-band signal. For example, the sampling unit 221, the sampling unit 222, the sampling unit 223, and the sampling unit 224 may sample the sub-band signals and generate a digital signal 2351, a digital signal 2352, a digital signal 2353, and a digital signal 2354, respectively.

In some embodiments, the sampling unit may sample a sub-band signal using a band pass sampling technique. For example, a sampling unit may be configured to sample a sub-band signal using band pass sampling with a sampling frequency according to the frequency band of the sub-band signal. Merely by way of example, the sampling unit may sample a sub-band signal with a frequency band that is no less than two times the bandwidth of the frequency band of the sub-band signal. In some embodiments, the sampling unit may sample a sub-band signal with a frequency band that is no less than two times the bandwidth of the frequency band of the sub-band signal and no greater than four times the bandwidth of the frequency band of the sub-band signal. In some embodiments, by using a band pass sampling technique rather than a bandwidth sampling technique or a low-pass sampling technique, a sampling unit may sample a sub-band signal with a relative low sampling frequency, reducing the difficulty and cost of the sampling process. Also, by using bandpass sampling technique, little noise or signal distortion may be introduced in the sampling process. As described in connection with FIG. 1, the signal processing system 100 (e.g., the sub-band filtering module 130) may perform a digital signal processing process through a software program to generate sub-band signals, which may introduce signal distortions due to factors including the algorithms used in the signal processing process, sampling methods used in the sampling process, and structures of the components in the signal processing system 100 (e.g., the acoustic-electric transducer 110, the sampling module 120, and/or the sub-band filtering module 130). As compared to sub-band filtering module 130, the signal processing system 200 may generate sub-band signals based on structures and characteristics of the acoustic-electric transducers.

The sampling unit may transmit the generated digital signal to the signal processing module 240. In some embodiments, the digital signals may be transmitted via parallel transmitters. In some embodiments, the digital signals may be transmitted via a transmitter according to a certain communication protocol. Exemplary communication protocol may include AES3 (audio engineering society), AES/EBU (European broadcast union)), EBU (European broadcast union), ADAT (Automatic Data Accumulator and Transfer), I2S (Inter-IC Sound), TDM (Time Division Multiplexing), MIDI (Musical Instrument Digital Interface), CobraNet, Ethernet AVB (Ethernet Audio/VideoBridging), Dante, ITU (International Telecommunication Union)-T G.728, ITU-T G.711, ITU-T G.722, ITU-T G.722.1, ITU-T G.722.1 Annex C, AAC (Advanced Audio Coding)-LD, or the like, or a combination thereof. The didital signal may be transmitted in a certain format including a CD (Compact Disc), WAVE, AIFF (Audio Interchange File Format), MPEG (Moving Picture Experts Group)-1, MPEG-2, MPEG-3, MPEG-4, MIDI (Musical Instrument Digital Interface), WMA (Windows Media Audio), RealAudio, VQF (Transform-domain Weighted Nterleave Vector Quantization), AMR (Adaptibve Multi-Rate), APE, FLAC (Free Lossless Audio Codec), AAC (Advanced Audio Coding), or the like, or a combination thereof The signal processing module 240 may process the data received from other components in the signal processing device 200. For example, the signal processing module 240 may process the digital signals transmitted from the sampling units in the sampling module 220. The signal processing module 240 may access information and/or data stored in the sampling module 220. As another example, the signal processing module 240 may be directly connected to the sampling module 220 to access stored information and/or data. In some embodiments, the signal processing module 240 may be implemented by a processor such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

It should be noted that the above descriptions of the signal processing device 200 is merely provided for the purposes of illustration, and not intended to limit the scope of the present disclosure. For a person having ordinary skill in the art, multiple variations and modifications may be made under the teaching of the present invention. However, those variations and modifications do not depart from the scope of the present disclosure. For example, the signal processing device 200 may further include a storage to store the signals received from other components in the signal processing device 200 (e.g., the acoustic-electric transducing module 210, and/or the sampling module 220). Exemplary storage may include a mass storage, removable storage, a volatile read-and-write memory, a read-only memory (ROM), or the like, or a combination thereof. As another example, one or more transmitters may be omitted. The plurality of sub-band signals may be transmitted by media of wave such as infrared wave, electromagnetic wave, sound wave, or the like, or a combination thereof. As a further example, the acoustic-electric transducing module 210 may include 2, 3, or 4 acoustic-electric transducers.

Figure 3:
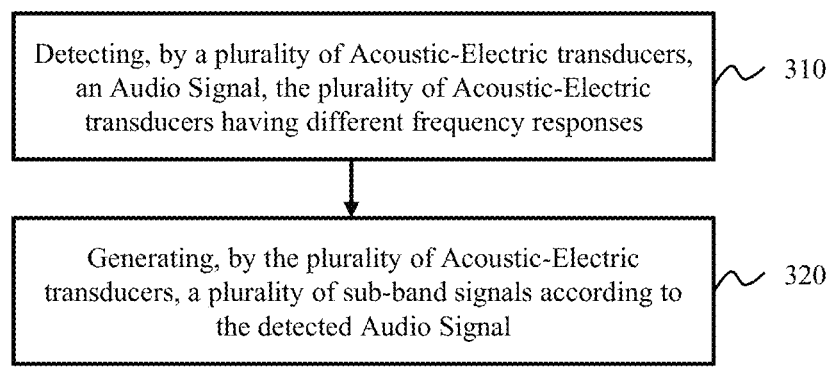
FIG. 3 is a flowchart of an exemplary process for processing an audio signal according to some embodiments of the present disclosure.

FIG. 3 is a flowchart illustrating an exemplary process for processing an audio signal according to some embodiments of the present disclosure. At least a portion of process 300 may be implemented on the signal processing device 200 as illustrated in FIG. 2.

In 310, an audio signal 205 may be detected. The audio signal 205 may be detected by a plurality of acoustic-electric transducers. In some embodiments, the acoustic-electric transducers may have different frequency responses. The plurality of acoustic-electric transducers may be arranged in the same signal processing device 200 as illustrated in FIG. 2. The audio signal 205 may have a certain frequency band.

In 320, a plurality of sub-band signals may be generated according to the audio signal 205. The plurality of sub-band signals may be generated by the plurality of acoustic-electric transducers. At least two of the generated sub-band signals may have different frequency bands. Each sub-band signal may have a frequency band that is within the frequency band of the audio signal 205.

It should be noted that the above description regarding the process 300 is merely provided for the purposes of illustration, and not intended to limit the scope of the present disclosure. For a person having ordinary skill in the art, multiple variations and modifications may be made under the teachings of the present disclosure. However, those variations and modifications do not depart from the scope of the present disclosure. In some embodiments, one or more operations in process 300 may be omitted, or one or more additional operations may be added. For example, the process 300 may further include an operation for sampling the sub-band signals after operation 320.

Figure 4:
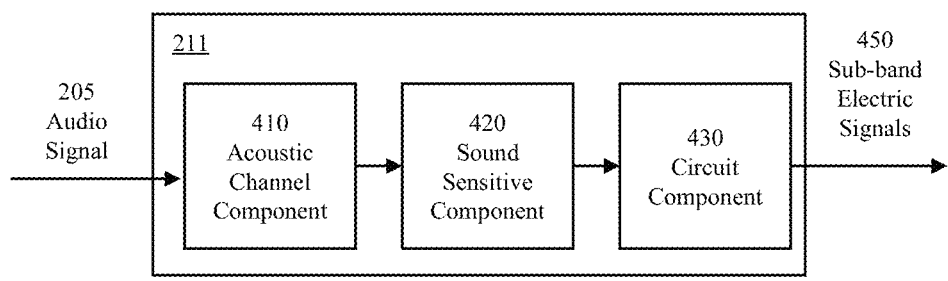
FIG. 4 is a schematic diagram of an exemplary acoustic-electric transducer according to some embodiments of the present disclosure.

FIG. 4 is a schematic diagram of an exemplary acoustic-electric transducer according to some embodiments of the present disclosure. The acoustic-electric transducer 211 may be configured to convert an audio signal to an electric signal. The acoustic-electric transducer 211 may include an acoustic channel component 410, a sound sensitive component 420, and a circuit component 430.

The acoustic channel component 410 may affect the path through which an audio signal is transmitted to the sound sensitive component 420 by the acoustic channel component 410's acoustic structure, which may process the audio signal before the audio signal reaches the sound sensitive component 420. In some embodiments, the audio signal may be an air-conduction-sound signal, and the acoustic structure of the acoustic channel component 410 may be configured to process the air-conduction-sound signal. Alternatively, the audio signal may be a bone-conduction-sound signal, and the acoustic structure of the acoustic channel component 410 may be configured to process the bone-conduction-sound signal. In some embodiments, the acoustic structure may include one or more chamber structures, one or more pipe structures, or the like, or a combination thereof.

In some embodiments, the acoustic impedance of an acoustic structure may change according to the frequency of a detected audio signal. In some embodiments, the acoustic impedance of an acoustic structure may change within a certain range. Thus, in some embodiments, the frequency band of an audio signal may cause corresponding changes in the acoustic impedance of an acoustic structure. In other words, the acoustic structure may function as a filter that processes a sub-band of a detected audio signal. In some embodiments, an acoustic structure mainly including a chamber structure may function as a high-pass filter, while an acoustic structure mainly including a pipe structure may function as a low-pass filter.

In some embodiments, the acoustic impedance of an acoustic structure which mainly includes a chamber structure may be determined according to Equation (1) as follows:

$$Z = \frac{1}{j\omega C_a} = \frac{\rho_0 c_0}{j\omega V_0}, \tag{1}$$

Where Z refers to the acoustic impedance, $\omega$ refers to the angular frequency (e.g., the chamber structure), j refers to an unit imaginary number $C_a$ refers to the sound capacity, $\rho_0$ refers to the density of air, $c_0$ refers to the speed of sound, and $V_0$ refers to the equivalent volume of the chamber.

In some embodiments, the acoustic impedance of an acoustic structure which mainly includes a pipe structure may be determined according to Equation (2) as follows:

$$Z = j\omega M_a = j\omega \frac{\rho_0 l_0}{S}, \tag{2}$$

Where Z refers to the acoustic impedance, $M_a$ refers to the acoustic mass, $\omega$ refers to the angular frequency of the acoustic structure (e.g., the pipe structure), $\rho_0$ refers to the density of air, $l_0$ refers to the equivalent length of the pipe, and S refers to the cross-sectional area of the orifice.

A chamber-pipe structure is a combination of the sound capacity and the acoustic mass in serial, for example, a Helmholtz resonator, and an inductor-capacitor (LC) resonance circuit may be formed. The acoustic impedance of a chamber-pipe structure may be determined according to Equation (3) as follows:

$$Z = j\left(\omega M_a - \frac{1}{\omega C_a}\right). \quad (3)$$

According to Equation (3), a chamber-pipe structure may function as a bandpass filter. The center frequency of the bandpass filter may be determined according to Equation (4) as follows:

$$\omega_0 = \sqrt{M_a C_a} \quad (4).$$

If an acoustic resistance material is used in the chamber-pipe structure, a resistor-inductor-capacitor (RLC) series loop may be formed, and the acoustic impedance of the RLC series loop may be determined according to Equation (5) as follows:

$$Z = R_a + j\left(\omega M_a - \frac{1}{\omega C_a}\right), \quad (5)$$

where $R_a$ refers to the acoustic resistance of the RLC series loop. The chamber-pipe structure may also function as a band pass filter. The adjustment of the acoustic resistance $R_a$ may change the bandwidth of the band pass filter. The center frequency of the bandpass filter may be determined according to Equation (6) as follows:

$$\omega_0 = \sqrt{M_a C_a} \quad (6).$$

The sound sensitive component 420 may convert the audio signal transmitted by the acoustic-channel component to an electric signal. For example, the sound sensitive component 420 may convert the audio signal into changes in electric parameters, which may be embodied as an electric signal. The structure of the sound sensitive component 420 may include diaphragms, plates, cantilevers, etc. In some embodiments, the sound sensitive component 420 may include one or more diaphragms. Details regarding the structure of a sound sensitive component 420 including a diaphragm may be found elsewhere in this disclosure (e.g., FIGS. 6A and 6B and the descriptions thereof). Details regarding the structure of a sound sensitive component 420 including multiple diaphragms may be found elsewhere in this disclosure (e.g., FIGS. 7A and 8A and the descriptions thereof). The diaphragms included in the sound sensitive component 420 may be connected in parallel (e.g., as illustrated in FIG. 7A) or series (e.g., as illustrated in FIG. 8A). In some embodiments, referring to FIGS. 7B and 7C and the descriptions thereof, the bandwidth of the frequency response of a sound sensitive component 420 having multiple diaphragms that are connected in parallel may be wider and flatter than the bandwidth of the frequency response of the sound sensitive component 420 having a diaphragm. In some embodiments, referring to FIG. 8B and the descriptions thereof, the bandwidth of the frequency response of a sound sensitive component 420 having multiple diaphragms that are connected in series may have a sharper edge than the bandwidth of the frequency response of the sound sensitive component 420 having a diaphragm. The material of the sound sensitive component 420 may include plastics, metals, composites, piezoelectric materials, etc. More detailed descriptions about the sound sensitive component 420 may be found elsewhere in the present disclosure (e.g., FIGS. 6A-9D and the descriptions thereof).

As described in connection with the acoustic channel component 410, the acoustic channel component 410 or the sound sensitive component 420 may function as a filter. A structure including an acoustic channel component 410 and a sound sensitive component 420 may also function as a filter. Detailed description of the structure may be found in FIG. 9A and FIG. 9B and the descriptions thereof.

In some embodiments, by modifying parameter(s) (e.g. structure parameters) of an acoustic channel component 410 and/or a sound sensitive component 420, the frequency response of the combination of the acoustic channel component 410 and the sound sensitive component 420 may be adjusted accordingly. For example, FIG. 9C illustrates exemplary frequency responses of two combination structures according to some embodiments of the present disclosure. Dotted line 931 represents the frequency response of a combination of an acoustic channel component and a sound sensitive component (or referred to as a first combination structure). One or more parameters (e.g., structural parameters) of the acoustic channel component or the sound sensitive component may be modified, resulting in a second combination structure that is different from the first combination structure. Solid line 933 may indicate the frequency response of the second combination structure. As illustrated by FIG. 9C, the frequency response of the second combination structure (i.e., solid line 933) may be flatter than the frequency response of the first combination structure (i.e., dotted line 931), in the frequency band 20 HZ-20,000 HZ.

In some embodiments, the frequency response of a combination of an acoustic channel component 410 and a sound sensitive component 420 may be related to the frequency response of the acoustic channel component 410 and/or the frequency response of the sound sensitive component 420. For example, the steepness of the edges of the frequency response of the combination of the acoustic channel component 410 and the sound sensitive component 420 may be related to the extent to which the cutoff frequency of the frequency response of the acoustic channel component 410 is close to the cutoff frequency of the frequency response of the sound sensitive component 420. The edges of the frequency response of the combination of the acoustic channel component 410 and the sound sensitive component 420 may be steeper, when the cutoff frequency of the frequency response of the acoustic channel component 410 and the cutoff frequency of the frequency response of the sound sensitive component 420 is closer to each other. For example, FIG. 9D illustrates an exemplary frequency response of a combination structure according to some embodiments of the present disclosure. Dashed line 941 represents the frequency response of a sound sensitive component. Dotted line 943 represents the frequency response of an acoustic channel component, and solid line 945 may indicate the frequency response of a combination of the acoustic channel component and the sound sensitive component. As illustrated by FIG. 9D, the corner frequency (also referred to as cutoff frequency) of the acoustic channel component (i.e., dotted line 943) may be close to or the same as the corner frequency of the sound sensitive component (i.e., dashed line 941), which may result in the frequency of the combination of the acoustic channel component and the sound sensitive component (i.e., solid line 945) to have a steeper edge.

In some embodiments, one or more structure parameters of the acoustic channel component 410 and/or the sound sensitive component 420 may be modified or adjusted. For example, the spacing between different elements in the acoustic channel component 410 and/or the sound sensitive component 420 may be adjusted by a motor, which is driven by the feedback module illustrated elsewhere in the present disclosure. As another example, the current flowing through the sound sensitive component 420 may be adjusted under instructions sent, e.g., by the feedback module. The adjustment of one or more structure parameters of the acoustic channel component 410 and/or the sound sensitive component 420 may result in changes in the filtering characteristic of thereof.

The circuit component 430 may detect the changes in electric parameters (e.g., an electric signal). In some embodiments, the circuit component 430 may perform one or more functions on electric signals for further processing. Exemplary functions may include amplification, modulation, simple filtering, or the like, or a combination thereof. In some embodiments, via adjusting one or more parameters of the circuit component 430, sensitivity of corresponding pass-bands may be adjusted to match each other. In some embodiments, the circuit components 430 may adjust the sensitivity of one or more pass-bands according to conditions such as a preset instruction, a feedback signal, or a control signal transmitted by a controller, or the like, or a combination thereof. In some embodiments, the circuit components 430 may adjust the sensitivity of one or more pass-bands automatically.

Figure 5A:
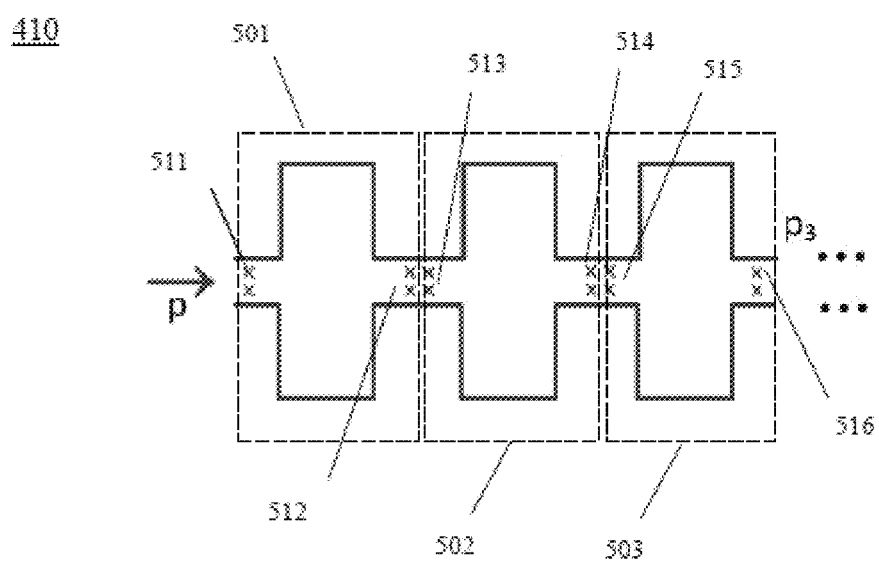
FIG. 5A illustrates an exemplary acoustic channel component according to some embodiments of the present disclosure.

FIG. 5A illustrates an exemplary acoustic channel component 410 according to some embodiments of the present disclosure. The acoustic channel component 410 may include one or more pipe structures. FIG. 5A depicts three exemplary pipe structures, namely, a first pipe structure 501, a second pipe structure 502, and a third pipe structure 503. Each pipe structure may include a front acoustic resistance material to detect or receive an audio signal, and an end acoustic resistance material to output a signal according to the audio signal. For example, the first pipe structure 501 may include a front acoustic resistance material 511 and an end acoustic resistance material 512. The second pipe structure 502 may include a front acoustic resistance material 513, and an end acoustic resistance material 514. The third pipe structure 503 may include a front acoustic resistance material 515, and an end acoustic resistance material 516. When sound pressure P passes the first pipe structure 501, the second pipe structure 502, and the third pipe structure 503 successively, the sound pressure P may become sound pressure $P_3$. An exemplary circuit corresponding to the acoustic channel component 410 (or referred to as an acoustic filtering network) may be illustrated in FIG. 5B.

Figure 5B:
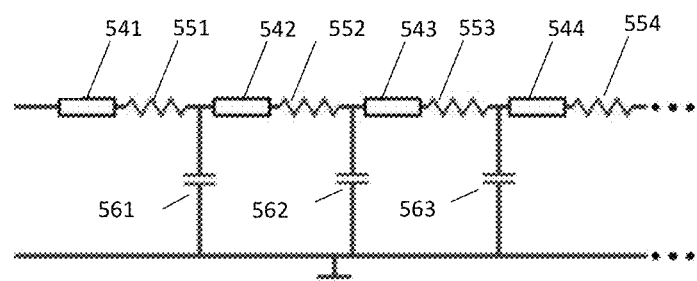
FIG. 5B illustrates an exemplary equivalent circuit model of the acoustic channel component shown in FIG. 5A according to some embodiments of the present disclosure.

FIG. 5B illustrates an exemplary equivalent circuit model of the acoustic channel component 410 shown in FIG. 5A according to some embodiments of the present disclosure. The circuit may include a first resistor 541, a second resistor 542, a third resistor 543, a fourth resistor 544, a first inductor 551, a second inductor 552, a third inductor 553, a fourth inductor 554, a first capacitor 561, a second capacitor 562, and a third capacitor 563. A first end of the first capacitor 561 may connect to a first end of the first inductor 551, and a first end of the second resistor 542. A second end of the first inductor 551 may connect to a first end of the first resistor 541. A first end of the second capacitor 562 may connect to a first end of the second inductor 552, and a first end of the third resistor 543. A second end of the second inductor 552 may connect to a second end of the second resistor 542. A first end of the third capacitor 563 may connect to a first end of the third inductor 553, and a first end of the fourth resistor 544. A second end of the third inductor 553 may connect to a second end of the third resistor 543. A first end of the fourth inductor 554 may connect to a second end of the fourth resistor 544.

Figure 6A:
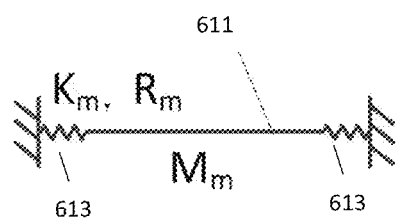
FIG. 6A is a schematic diagram of an exemplary mechanical model of a sound sensitive component according to some embodiments of the present disclosure.
Figure 7A:
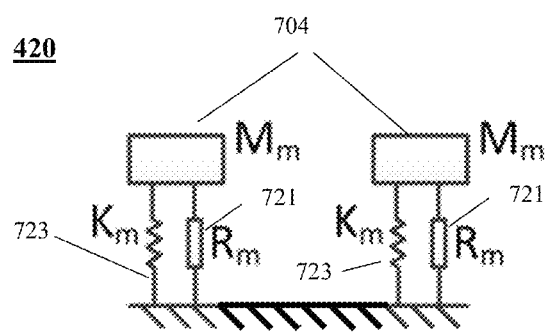
FIG. 7A is a schematic diagram of a mechanical model of an exemplary sound sensitive component according to some embodiments of the present disclosure.

FIG. 6A is a schematic diagram of an exemplary mechanical model of the sound sensitive component 420 according to some embodiments of the present disclosure. One or more elements in the sound sensitive component 420 may vibrate according to an audio signal impinging on it. The audio signal may be transmitted from the acoustic channel component 410. In some embodiments, the vibration of one or more elements in the sound sensitive component 420 may lead to changes in electric parameters of the sound sensitive component 420. Sound sensitive component 420 may be sensitive to a certain frequency band of an audio signal. The frequency band of an audio signal may cause corresponding changes in electric parameters of the sound sensitive component 420. In other words, the sound sensitive component 420 may function as a filter that process a sub-band of the audio signal.

In some embodiments, the sound sensitive component 420 may be a diaphragm. FIG. 6A illustrates an exemplary diaphragm, which may include a diaphragm 611, and an elastic component 613. A first point of the diaphragm 611 may connect to a first point of the elastic component 613. A second point of the diaphragm 611 may connect to and a second point of the elastic component 613.

Figure 6B:
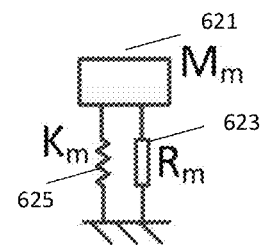
FIG. 6B is a schematic diagram of an exemplary mechanical model of a sound sensitive component according to some embodiments of the present disclosure.

FIG. 6B is a schematic diagram of an exemplary mechanical model of sound sensitive component 420 according to some embodiments of the present disclosure. The sound sensitive component 420 may be a diaphragm. As illustrated in FIG. 6B, the diaphragm may include a diaphragm 621, a damping component 623, and an elastic component 625. A first end of the diaphragm 621 may connect to a first end of the damping component 623, and a first end of the elastic component 625 (e.g., a spring). A second end of the damping component 623 may be fixed. A second end of the elastic component 625 may be fixed.

Figure 6C:
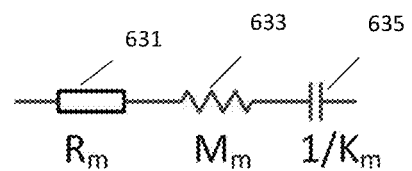
FIG. 6C is a schematic diagram of an exemplary equivalent circuit model corresponding to the mechanical model shown in FIGS. 6A and 6B according to some embodiments of the present disclosure.

FIG. 6C is a schematic diagram of an exemplary equivalent circuit model corresponding to the mechanical model shown in FIGS. 6A and 6B according to some embodiments of the present disclosure. The circuit may include a resistor 631, an inductor 633, and a capacitor 635. A first end of the inductor 633 may connect to a first end of the resistor 631. A second end of the inductor 633 may connect to a first end of the capacitor 635. The circuit may constitute an RLC series circuit, which may act as a bandpass filter. The center frequency of the bandpass filter may be determined according to Equation (9) as follows:

$$\omega_0 = \sqrt{\frac{K_m}{M_m}}, \qquad (9)$$

where $M_m$ refers to the mass of the diaphragm, $K_m$ refers to the elasticity coefficient of the diaphragm, and $R_m$ refers to the damping of the diaphragm. $R_m$ may be adjusted to modify the bandwidth of the filter implemented by the RLC series circuit. In some embodiments, the acoustic structure, which may affect the path through which an audio signal is transmitted to the sound sensitive component 420, or the sound sensitive component 420, which may convert the audio signal to an electric signal, may affect the audio signal in both frequency domain and time domain. In some embodiments, one or more characteristics of the sound sensitive component 420 may be adjusted by adjusting one or more non-linear time-varying characteristics of the materials of the sound sensitive component 420 to meet certain filtering requirements. Exemplary non-linear time-varying characteristics may include hysteresis delay, creep, non-Newtonian characteristics, or the like, or a combination thereof.

FIG. 7A is a schematic diagram of a mechanical model of an exemplary sound sensitive component 420 according to some embodiments of the present disclosure. In some embodiments, multiple sound sensitive components may be combined to achieve certain filtering characteristics.

As shown in FIG. 7A, the mechanical model may include a plurality of sound sensitive components. The sound sensitive components may be connected in parallel. The mechanical model corresponding to each sound sensitive component may include a diaphragm 704, a damping component 721, and an elastic component 723. More detailed descriptions about an individual sound sensitive component may be found elsewhere in the present disclosure (e.g., FIGS. 6B and 6C, and the descriptions thereof). In some embodiments, the sound sensitive component 420 including multiple sound sensitive components may perform multi-peak filtering, multi-center-frequency filtering, or multi-bandpass filtering.

Figure 7B:
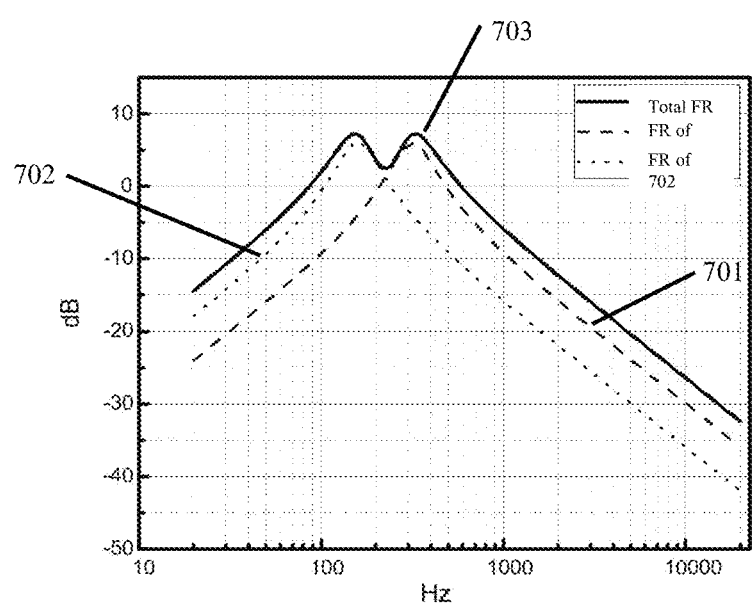
FIG. 7B illustrates exemplary frequency responses corresponding to different sound sensitive components according to some embodiments of the present disclosure.
Figure 8A:
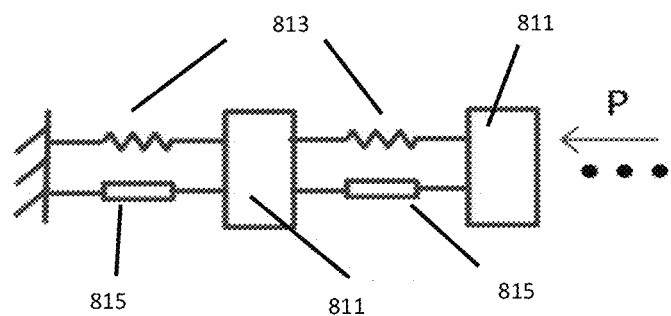
FIG. 8A is a schematic diagram of an exemplary mechanical model corresponding a sound sensitive component 420 according to some embodiments of the present disclosure.

FIG. 7B illustrates exemplary frequency responses corresponding to different sound sensitive components according to some embodiments of the present disclosure. The sound sensitive component 420 include a first sound sensitive component and a second sound sensitive component. The first sound sensitive component and the second sound sensitive component may be connected in parallel. The center frequency of the first sound sensitive component may be different from the center frequency of the second-sensitive component. For example, as shown in FIG. 7B, dotted line 701 represents the frequency response of the first sound sensitive component, while dashed line 702 represent the frequency response of the second sound sensitive component. Solid line 703 may indicate the frequency response of the combination of the first sound sensitive component and the second sound sensitive component. The bandwidth of the frequency response of the combination of the first sound sensitive component and the second sound sensitive component (i.e., the solid line 703) is wider and flatter than the frequency response of the first sound sensitive component (i.e., the dotted line 701) or the frequency response of the second sound sensitive component (i.e., the dashed line 702).

In some embodiments, the frequency responses of the first sound sensitive component and the second sound sensitive component may intersect with each other. In some embodiments, the frequency responses of the first sound sensitive component and the second sound sensitive component may intersect at a frequency point that is not near the half-power point. As described in connection with FIGS. 10A-10C and the descriptions thereof, when the frequency responses of acoustic-electric transducers intersect near or at the half-power point(s), the frequency response of an acoustic-electric transducing module 210 which includes the acoustic-electric transducers may be flatter than that of an acoustic-electric transducing module 210 when the acoustic-electric transducers therein do not intersect near nor at the half-power point(s). However, since the first sound sensitive component and the second sound sensitive component are arranged in the same sound sensitive component 420, and the overlap of the frequency responses of the first sound sensitive component and the second sound sensitive component may be overlap of vectors, in which the output phases of the first sound sensitive component and the second sound sensitive component should be taken into consideration. Thus, when the frequency response of the first sound sensitive component and the frequency response of the second sound sensitive component intersect at a frequency point that is not near the half-power point, the frequency response of a combination of the first sound sensitive component and the second sound sensitive component may be flatter and wider than that of a combination of two sound sensitive components that have frequency response that intersect at a frequency point near or at the half-power point.

Figure 7C:
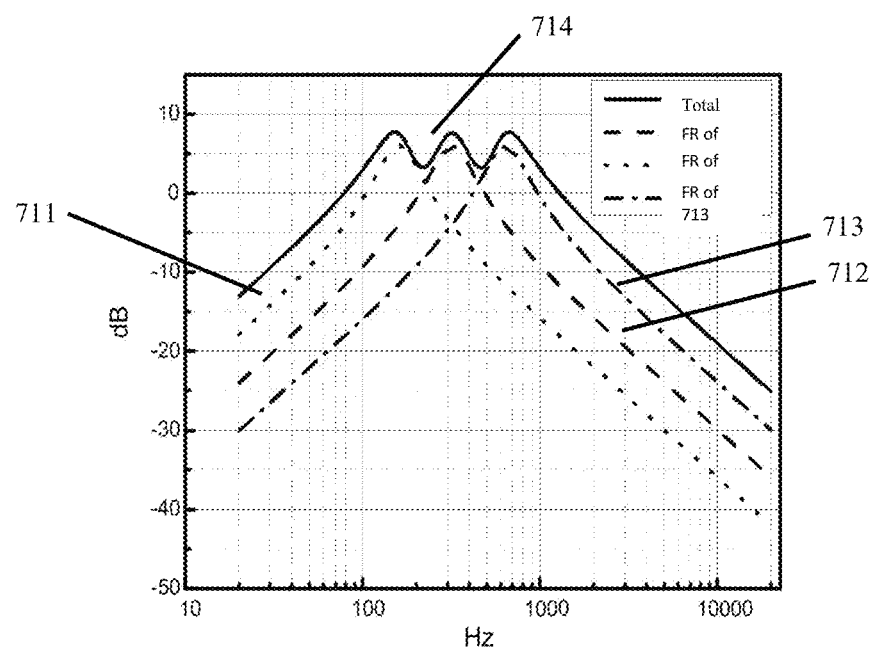
FIG. 7C illustrates exemplary frequency responses of different sound sensitive components according to some embodiments of the present disclosure.

FIG. 7C illustrates exemplary frequency responses of different sound sensitive components according to some embodiments of the present disclosure. As shown in FIG. 7C, the sound sensitive component 420 may include a first sound sensitive component, a second sound sensitive component, and a third sound sensitive component, which are connected in parallel. The first sound sensitive component, the second sound sensitive component, and the third sound sensitive component may be underdamping sound sensitive components, and may be referred to as a first underdamping sound sensitive component, a second underdamping sound sensitive component, and a third underdamping sound sensitive component, respectively. The center frequency of each sound sensitive component may be different. For example, as shown in FIG. 7C, dotted line 711, dashed line 712, and dashed-dotted line 713 represent the frequency responses of the first sound sensitive component, the second sound sensitive component, and the third sound sensitive component, respectively. Solid line 714 may indicate the frequency response of the combination of the first sound sensitive component, the second sound sensitive component, and the third sound sensitive component. The bandwidth of the frequency response of the combination of the first sound sensitive component, the second sound sensitive component and the third sound sensitive component (i.e., solid line 714) is wider and flatter than the frequency response of the first sound sensitive component (i.e., dotted line 711, or referred to as a fourth frequency response), the frequency response of the second sound sensitive component (i.e., dashed line 712, or referred to as a fifth frequency response), or the frequency response of the third sound sensitive component (i.e., dashed-dotted line 713, or referred to as a sixth frequency response).

The center frequency of the second underdamping sound sensitive component (or referred to as a fifth center frequency) is higher than the center frequency of the first underdamping sound sensitive (or referred to as a fourth center frequency), and the center frequency of the third underdamping sound sensitive component (or referred to as a sixth center frequency) is higher than the center frequency of the second underdamping sound sensitive.

In some embodiments, the fourth frequency response and the fifth frequency response intersect at a point which is near a half-power point of the fourth frequency response and a half-power point of the fifth frequency response. That is, the fourth frequency response and the fifth frequency response intersect at a point with a power level no smaller than −5 dB and no larger than −1 dB.

As described in connection with FIG. 7B, when the frequency responses of the first sound sensitive component and the second sound sensitive component, and the third sound sensitive component may intersect at frequency points that are not near the half-power point, the frequency response of the combination of the first sound sensitive component and the second sound sensitive component, and the third sound sensitive component may be flatter and wider than that of a combination of three sound sensitive components that have frequency response that intersect at frequency points near or at the half-power point.

FIG. 8A is a schematic diagram of an exemplary mechanical model corresponding a sound sensitive component 420 according to some embodiments of the present disclosure. The mechanical model corresponding to the sound sensitive component 420 may include a plurality of sound sensitive components. The plurality of sound sensitive components may be connected in serial. For example, as illustrated in FIG. 8A, the sound sensitive component 420 may include two sound sensitive components, each of which may include a diaphragm 811, a damping component 815, and an elastic component 813. An audio signal (the sound pressure being P) may arrive at a diaphragm 811, and cause the sound sensitive component 420 to generate an electric signal (not shown). More detailed descriptions of an individual sound sensitive component may be found elsewhere in the present disclosure (e.g., FIGS. 6B and 6C, and the descriptions thereof).

Figure 8B:
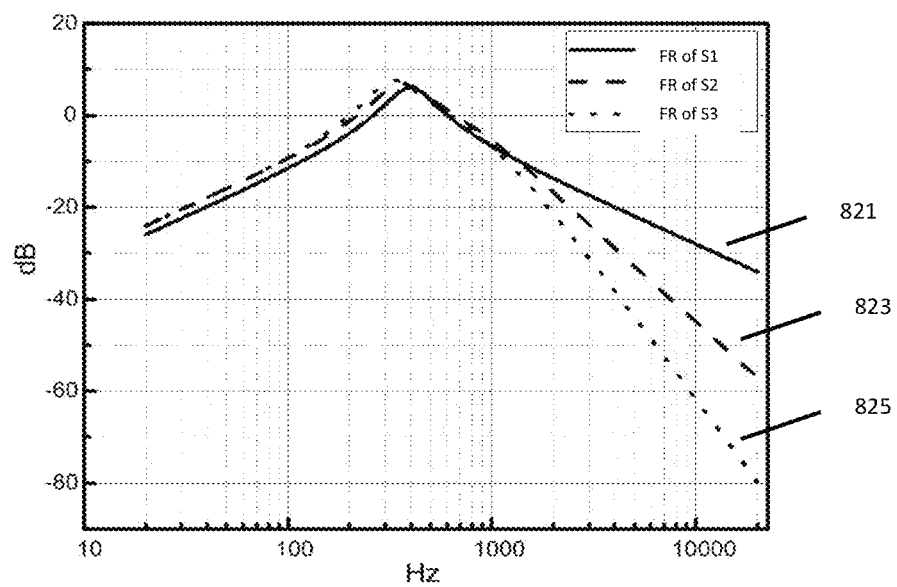
FIG. 8B illustrates exemplary frequency responses corresponding to different sound sensitive components according to some embodiments of the present disclosure.

FIG. 8B illustrates exemplary frequency responses corresponding to different sound sensitive components according to some embodiments of the present disclosure. Solid line 821 represents the frequency response of one sound sensitive component. Dotted line 823 represents the frequency response of a combination of two sound sensitive components connected in serial. Dashed line 825 represents the frequency response of a combination of three sound sensitive components connected in serial. As illustrated by FIG. 8B, the number of sound sensitive components may affect the frequency response of the acoustic-transducing device in which they are arranged. The frequency response of the combination of three sound sensitive components connected in serial (i.e., dashed line 825) may have a steeper edge than the frequency response of the combination of two sound sensitive components connected in serial (i.e., dashed line 823). The frequency response of the combination of the two sound sensitive components connected in serial (i.e., dashed line 823) may have a steeper edge than the frequency response of one sound sensitive component (i.e., solid line 821). In some embodiments, when more sensitive components are arranged in a same acoustic-transducing device, the order of the acoustic-transducing device may increase.

In some embodiments, three sound sensitive components may be connected in series. As known to those skilled in the art, a sound sensitive component may have a lower cut-off frequency and an upper cut-off frequency. In some embodiments, the center frequency of any of the three sound sensitive components may be larger than the smallest cut-off frequency among the lower cut-off frequencies of the three sound sensitive components, and no larger than the largest cut-off frequency among the upper cut-off frequencies of the three sound sensitive components.

Figure 9A:
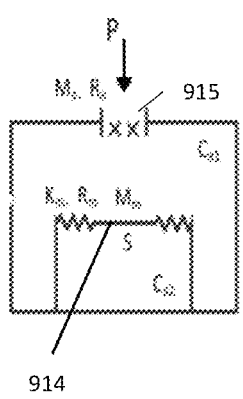
FIG. 9A illustrates a structure of a combination of an acoustic channel component and a sound sensitive component according to some embodiments of the present disclosure.

FIG. 9A illustrates a structure of a combination of an acoustic channel component and a sound sensitive component according to some embodiments of the present disclosure. The structure may be embodied as a diaphragm microphone with a front chamber and a rear chamber. As shown in FIG. 9A, an audio signal (the sound pressure being P) may first arrive at a sound hole 915 of an acoustic channel component, which may include an acoustic resistance material, and then arrive at a diaphragm 914 and a rear chamber of a sound sensitive component. P is the sound pressure on the microphone caused by an audio signal, and S is the effective area of the diaphragm. More detailed descriptions about the acoustic channel component may be found elsewhere in the present disclosure (e.g., FIGS. 5A and 5B and the descriptions thereof). More detailed descriptions about the sound sensitive component may be found elsewhere in the present disclosure (e.g., FIGS. 6A-6C and the descriptions thereof).

Figure 9B:
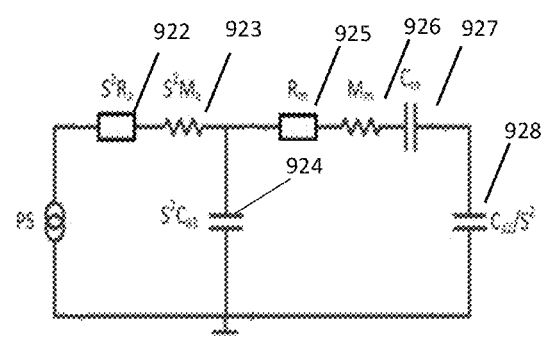
FIG. 9B is a schematic diagram of an exemplary equivalent circuit of the combination structure shown in FIG. 9A according to some embodiments of the present disclosure.
Figure 9C:
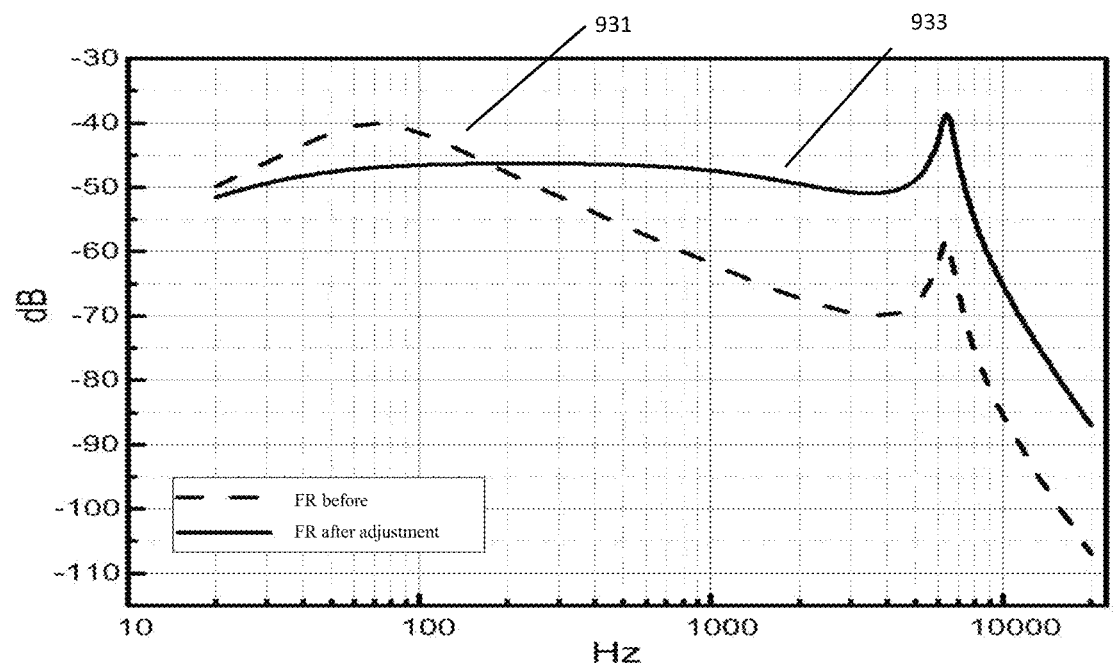
FIG. 9C illustrates exemplary frequency responses of two combination structures according to some embodiments of the present disclosure.
Figure 9D:
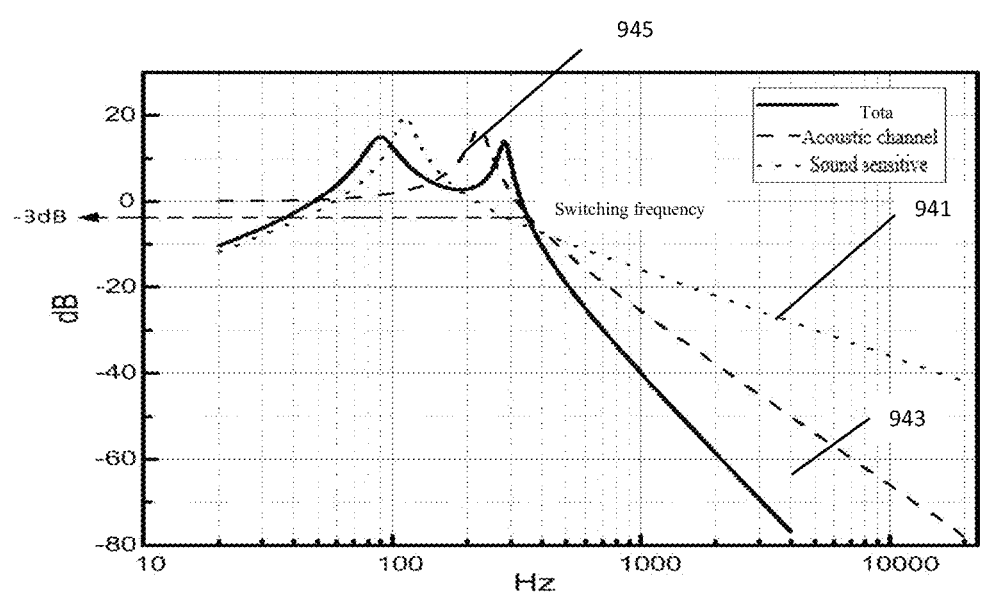
FIG. 9D illustrates an exemplary frequency response of a combination structure according to some embodiments of the present disclosure.

FIG. 9B is a schematic diagram of an exemplary circuit of the combination structure shown in FIG. 9A according to some embodiments of the present disclosure. In the circuit, a resistor 922 (with a resistance $S^2R_a$) and an inductor 923 (with an inductance $S^2M_a$) may indicate the acoustic resistance and the acoustic mass of the sound hole. A capacitor 924 (with a capacitance $S^2C_{a1}$) may indicate the acoustic capacitance of the front chamber. A capacitor 928 (with a capacitance $C_{a2}/S^2$) may indicate the acoustic capacitance of the rear chamber. A resistor 925 (with a resistance $R_m$), an inductor 926 (with an inductance $M_m$), and a capacitor 927 (with a capacitance $C_m$) may indicate the resistance of the diaphragm, the mass of the diaphragm, and the elasticity coefficient of the diaphragm, respectively.

FIGS. 10A-10C illustrates frequency responses of different acoustic-electric transducing modules according to some embodiments of the present disclosure. FIG. 10A, FIG. 10B, FIG. 10C illustrate the frequency response of a first acoustic-electric transducing module, a second acoustic-electric transducing module, and a third acoustic-electric transducing module, respectively. Each of the first acoustic-electric transducing module, the second acoustic-electric transducing module, and the third acoustic-electric transducing module may include three acoustic-electric transducers. As illustrated in FIG. 10A, the first acoustic-electric transducing module may include a transducer 1, a transducer 2, and a transducer 3. The frequency response of the transducer 1 intersects with the frequency response of the transducer 2 at a frequency point that is not near the half-power point, and the frequency response of the transducer 2 intersects with the frequency response of the transducer 3 at a frequency point that is not near the half-power point. As illustrated in FIG. 10B, the first acoustic-electric transducing module may include a transducer 4 (e.g., the first acoustic-electric transducer), a transducer 5 (e.g., the second acoustic-electric transducer), and a transducer 6 (e.g., the third acoustic-electric transducer). The transducer 4 has a first frequency bandwidth, and the transducer 5 has a second frequency bandwidth different from the first frequency bandwidth. The second frequency bandwidth is larger than the first frequency bandwidth, and the center frequency of the transducer 5 is higher than the center frequency of the transducer 4. The center frequency of the transducer 6 is higher than the center frequency of the transducer 5.

The frequency response of the transducer 4 intersects with the frequency response of the transducer 5 at a frequency point near the half-power point, and the frequency response of the transducer 5 intersects with the frequency response of the transducer 6 at a frequency point near the half-power point. For example, the frequency response of the transducer 4 and the frequency response of the transducer 5 intersect at a point which is near a half-power point of the frequency response of the transducer 4 and a half-power point of the frequency response of the transducer 5. As illustrated, the frequency response of the transducer 4 and the frequency response of the transducer 5 intersect at a point with a power level no smaller than −5 dB and no larger than −1 dB.

As illustrated in FIG. 10C, the first acoustic-electric transducing module may include a transducer 7, a transducer 8, and a transducer 9. The frequency response of the transducer 7 intersects with the frequency response of the transducer 8 at a frequency point not near the half-power point, and the frequency response of the transducer 8 intersects with the frequency response of the transducer 9 at a frequency point not near the half-power point. As illustrated by FIGS. 10A-10C, the frequency response of the second acoustic-electric transducing module may be flatter than the frequency response of the first acoustic-electric transducing module, and the frequency response of the third acoustic-electric transducing module indicate more interferences from adjacent channels than the frequency response of the second acoustic-electric transducing module. Descriptions illustrated below may be provided to illustrate the relationship between the frequency response of an acoustic-electric transducing module and where the acoustic-electric transducers in the acoustic-electric transducing module intersect with each other.

Frequency responses of the acoustic-electric transducers may intersect with each other at certain frequency points, resulting in a certain overlap range between the frequency responses. As used herein, an overlap range relates to the frequency point at which the frequency responses intersect with each other. The overlap of the frequency responses of acoustic-electric transducers may cause interferences in adjacent channels that are configured to output electric signals generated by the acoustic-electric transducers in the acoustic-electric transducing module 210. In some cases, the larger overlap range, more interference may be. The center frequencies and bandwidths of the response frequencies of the acoustic-electric transducers may be adjusted to obtain a narrower overlap range among frequency responses of the acoustic-electric transducers.

For example, the acoustic-electric transducing module 210 may include multiple first-order acoustic-electric transducers. The center frequency of each of the acoustic-electric transducers may be adjusted by adjusting structure parameters thereof, to achieve certain overlap ranges. The overlap range between two frequency responses of two adjacent acoustic-electric transducers may relate to the interference range between the sub-band signals output by the acoustic-electric transducers. In an ideal scenario, no overlap range between two frequency responses of two adjacent acoustic-electric transducers. In practice, however, a certain overlap range may exist between two frequency responses of two adjacent acoustic-electric transducers, which may affect the quality of the sub-band signals output by the two acoustic-electric transducers. If a relatively small overlap range between two frequency responses of two adjacent acoustic-electric transducers, the frequency response of a combination of the two adjacent acoustic-electric transducers may decrease within the overlap range. The decrease in the frequency response in a certain frequency band may indicate the decrease of power level in the frequency band. As used herein, the overlap range between two frequency responses may be deemed relatively small when the frequency responses intersect at a frequency point with a power level smaller than −5 dB. If a relatively large overlap band exists between two frequency responses of two adjacent acoustic-electric transducers, the frequency response of a combination of the two adjacent acoustic-electric transducers may increase within the overlap range. The increase in the frequency response in a certain frequency band may indicate a higher power level in the frequency band compared with that in other frequency ranges. The overlap range between two frequency responses may be deemed relatively small when the frequency responses intersect at a frequency point with a power level larger than −1 dB. When the frequency responses of two adjacent acoustic-electric transducers intersect near or at half-power point, the frequency response of each acoustic-electric transducer may contribute to the frequency response of a combination of the two adjacent acoustic-electric transducers in a such a manner that there is no loss nor repetition of energies in certain frequency bands, which may result in a proper overlap band between the frequency responses of two adjacent acoustic-electric transducers. The frequency responses of two adjacent acoustic-electric transducers may be deemed to intersect near or at half-power point when the frequency responses intersect at a frequency point with a power level no smaller than −5 dB and no larger than −1 dB. In some embodiments, via adjusting structure parameters of at least one acoustic-electric transducer of the two adjacent acoustic-electric transducers, the center frequency and the frequency bandwidth of the at least one acoustic-electric transducer of the two adjacent acoustic-electric transducers may be adjusted, resulting in adjusted overlap regions among the acoustic-electric transducers accordingly.

Figure 12:
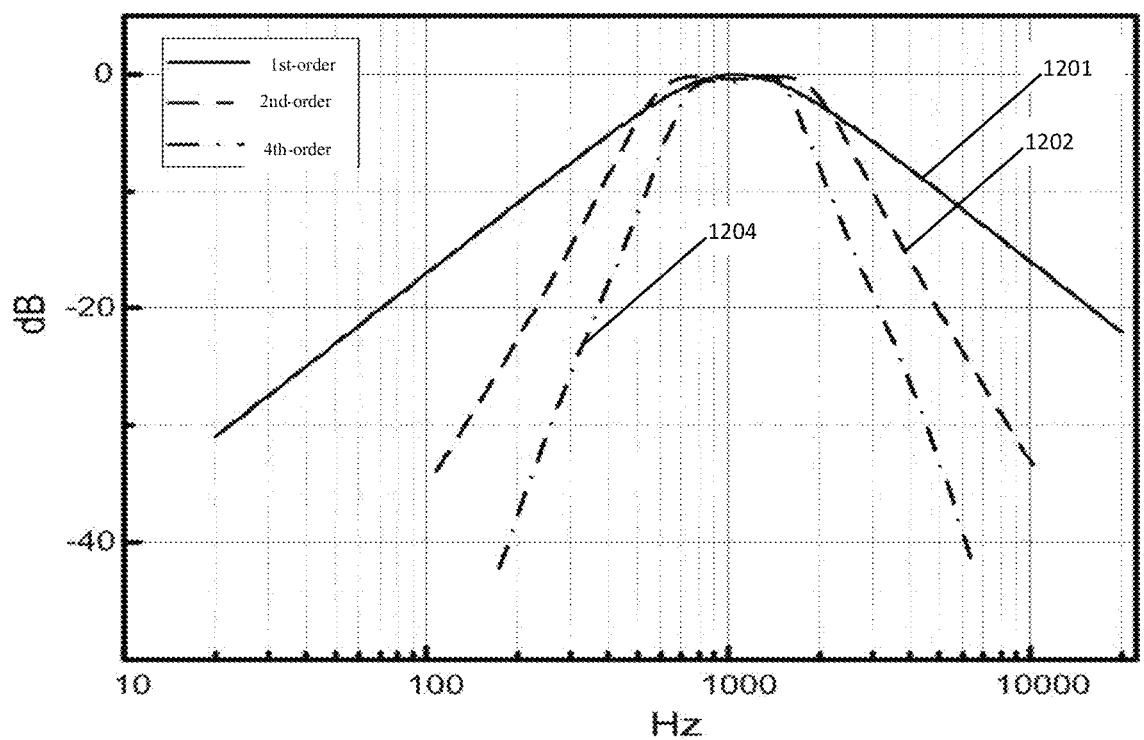
FIG. 12 illustrates the frequency responses of acoustic-electric transducers of different orders according to some embodiments of the present disclosure.

FIG. 12 illustrates the frequency responses of acoustic-electric transducers of different orders according to some embodiments of the present disclosure. The acoustic-electric transducing module 210 includes a plurality of acoustic-electric transducers. The frequency responses of the acoustic-electric transducers may overlap, introducing interference between adjacent signal processing channels in the acoustic-electric transducing module 210. As illustrated in FIG. 12, sold line 1201 represents the frequency response of a first-order acoustic-electric transducer, dotted line 1202 represents the frequency response of a second-order acoustic-electric transducer, while dashed-dotted line 1204 represents the frequency response of a fourth-order acoustic-electric transducer. The bandpass edge of the frequency response of the fourth-order acoustic-electric transducer (i.e., dashed-dotted line 1204) may be steeper than that of the second-order acoustic-electric transducer (i.e., dotted line 1202). The bandpass edge of the frequency response of the second-order acoustic-electric transducer (i.e., dotted line 1202) may be steeper than that of the first-order acoustic-electric transducer (i.e., sold line 1201). In some embodiments, the higher order of an acoustic-electric transducer, the greater the slope of the bandpass edge of the acoustic-electric transducer may be. According to the theoretical analysis, the slope of the bandpass edge of a first-order acoustic-electric transducer may be 6 dB/oct, and when the order of an acoustic-electric transducer increased by every 1 order, the slope of the bandpass edge may increase by 6 dB/oct. Thus, employing multi-order acoustic-electric transducer in acoustic-electric transducer module 210 may allow more acoustic-electric transducer to be included therein, which is usually desirable to ensure a wider coverage of the frequency band of an audio signal detected.

In some embodiments, the acoustic-electric transducers in the acoustic-electric transducing module 210 may be underdamping bandpass acoustic-electric transducers. In some embodiments, an underdamping bandpass acoustic-electric transducer may have a steeper slope than a non-underdamping bandpass acoustic-electric transducer, near the resonance peak in the frequency response of the acoustic-electric transducer. In some embodiments, the maximum number of acoustic-electric transducers allowed in a certain frequency band may be determined according to the filtering characteristics of the bandpass acoustic-electric transducers. For example, given that the frequency responses of the acoustic-electric transducers intersect with each other at half-power points, for a certain frequency range, the maximum number of the acoustic-electric transducers of certain order that may be allowed to be included in one acoustic-electric transducing module 210 may be shown in table 1:

TABLE 1

The numbers of acoustic-electric transducers to be included

| | Frequency band | | |
|---|---|---|---|
| Order | 20 Hz-20 kHz | 100 Hz-8 kHz | 300 Hz-4000 Hz |
| 1 | 10 | 7 | 4 |
| 2 | 20 | 13 | 8 |
| 3 | 30 | 19 | 12 |
| 4 | 40 | 26 | 15 |

For example, for the frequency band 20 Hz-20 kHz, an acoustic-electric transducing module 210 may include no more than 10 first-order acoustic-electric transducers. In some embodiments, via adjusting of one or more acoustic-electric transducers in an acoustic-electric transducing module 210 to an under-damped state, the acoustic-electric transducing module 210 may have a larger order. It is to be expressly understood, however, that Table 1 is for the purpose of illustration and description only and are not intended to limit the scope of the present disclosure. In some embodiments, various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure. In some embodiments, the acoustic-electric transducing module 210 may include a plurality of first acoustic-electric transducers. In some embodiments, the acoustic-electric transducing module 210 includes no more than 10 first-order acoustic-electric transducers, wherein each first-order acoustic-electric transducer corresponds to a frequency band whose width is no larger than 20 kHz. In some embodiments, the acoustic-electric transducing module 210 includes no more than 20 second-order acoustic-electric transducers, wherein each second-order acoustic-electric transducer corresponds to a frequency band whose width is no larger than 20 kHz. In some embodiments, the acoustic-electric transducing module 210 includes no more than 30 third-order acoustic-electric transducers, wherein each third-order acoustic-electric transducer corresponds to a frequency band whose width is no larger than 20 kHz. In some embodiments, the acoustic-electric transducing module 210 includes no more than 40 fourth-order acoustic-electric transducers, wherein each fourth-order acoustic-electric transducer corresponds to a frequency band whose width is no larger than 20 kHz. In some embodiments, the acoustic-electric transducing module 210 includes no more than 8 first-order acoustic-electric transducers, wherein each first-order acoustic-electric transducer corresponds to a frequency band whose width is no larger than 8 kHz. In some embodiments, the acoustic-electric transducing module 210 includes no more than 13 second-order acoustic-electric transducers, wherein each second-order acoustic-electric transducer corresponds to a frequency band whose width is no larger than 8 kHz. In some embodiments, the acoustic-electric transducing module 210 includes no more than 19 third-order acoustic-electric transducers, wherein each third-order acoustic-electric transducer corresponds to a frequency band whose width is no larger than 8 kHz. In some embodiments, the acoustic-electric transducing module 210 includes no more than 26 fourth-order acoustic-electric transducers, wherein each fourth-order acoustic-electric transducer corresponds to a frequency band whose width is no larger than 8 kHz. In some embodiments, the acoustic-electric transducing module 210 includes no more than 4 first-order acoustic-electric transducers, wherein each first-order acoustic-electric transducer corresponds to a frequency band whose width is no larger than 4 kHz. In some embodiments, the acoustic-electric transducing module 210 includes no more than 8 second-order acoustic-electric transducers, wherein each second-order acoustic-electric transducer corresponds to a frequency band whose width is no larger than 4 kHz. In some embodiments, the acoustic-electric transducing module 210 includes no more than 12 third-order acoustic-electric transducers, wherein each third-order acoustic-electric transducer corresponds to a frequency band whose width is no larger than 4 kHz. In some embodiments, the acoustic-electric transducing module 210 includes no more than 15 fourth-order acoustic-electric transducers, wherein each fourth-order acoustic-electric transducer corresponds to a frequency band whose width is no larger than 4 kHz.

FIGS. 13A and 13B illustrate the frequency responses of exemplary acoustic-electric transducing modules according to some embodiments of the present disclosure. FIG. 13A illustrates the frequency response of a first-order bandpass acoustic-electric transducing module (referred to as first-order bandpass acoustic-electric transducing module 1). FIG. 13B illustrates frequency responses of a first-order bandpass acoustic-electric transducing module (referred to as first-order bandpass acoustic-electric transducing module 2). The acoustic-electric transducer(s) in the first-order bandpass acoustic-electric transducing module 1 are non-underdamping acoustic-electric transducers, while the acoustic-electric transducer(s) in the first-order bandpass acoustic-electric transducing module 1 are underdamping acoustic-electric transducers. As can be seen from FIG. 13A and FIG. 13B, more acoustic-electric transducers may be included in an acoustic-electric transducing module when the acoustic-electric transducers are underdamping ones rather than non-underdamping ones. The first-order bandpass acoustic-electric transducing module 1 and the first-order bandpass acoustic-electric transducing module 2 includes 4 first-order bandpass acoustic-electric transducers and 6 first-order bandpass acoustic-electric transducers, respectively. The solid line in FIG. 13A represents the frequency response of the first-order bandpass acoustic-electric transducing module 1. The 4 dotted lines in FIG. 13A represent the frequency responses of the 4 acoustic-electric transducers respectively. The solid line in FIG. 13B represents the frequency response of the first-order bandpass acoustic-electric transducing module 2. The 6 dotted lines in FIG. 13B represent the frequency responses of the 6 acoustic-electric transducers respectively.

In some embodiments, the acoustic-electric transducing module may be regarded as a filter configured to achieve a designated filtering effect. In some embodiments, the filter may be a first-order filter or a multi-order filter. In some embodiments, the filter may be a linear or non-linear filter. In some embodiments, the filter may be a time-varying or non-time-varying filter. The filter may include a resonance filter, a Roex function filter, a Gamatone filter, a Gamachirp filter, etc.

In some embodiments, acoustic-electric transducing module may be a Gamatone filter. Specifically, bandwidths of the frequency responses of acoustic-electric transducers in the acoustic-electric transducing module may be different. Further, the acoustic-electric transducer having a higher center frequency may be set to have a larger bandwidth. Further, in some embodiments, the center frequency $f_c$ of an acoustic-electric transducer may be determined according to Equation (1) as follows:

$$f_c = (f_H + 228.7)\exp\left(-\frac{\alpha}{9.26}\right) - 228.7, \quad (1)$$

where $f_H$ refers to the cutoff frequency, and a refers to the overlap factor.

The bandwidth B of the acoustic-electric transducer may be set according to Equation (2) as follows:

$$B = 24.7 \times \left(4.37 \times \frac{f_c}{1000} + 1\right) \quad (2)$$

Figure 14A:
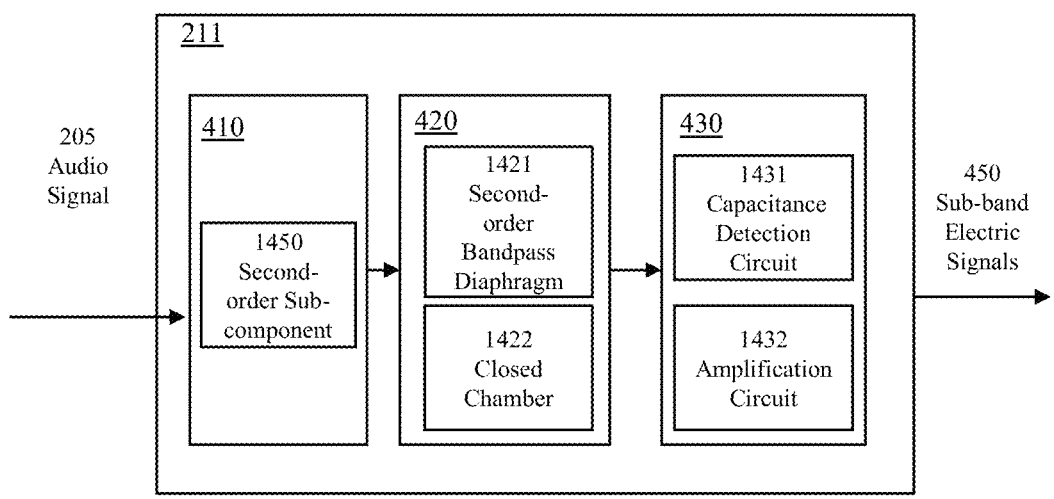
FIG. 14A is a schematic diagram of an exemplary acoustic-electric transducer according to some embodiments of the present disclosure.

FIG. 14A is a schematic diagram of an exemplary acoustic-electric transducer 211 according to some embodiments of the present disclosure. The acoustic-electric transducer 211 may include an acoustic channel component 410, a sound sensitive component 420, and a circuit component 430.

The acoustic channel component 410 may include a second-order component 1450. The sound sensitive component 420 may include a second-order bandpass diaphragm 1421, and a closed chamber 1422. The circuit component 430 may include a capacitance detection circuit 1431, and an amplification circuit 1432.

The acoustic-electric transducer 211 may be an air-conduction acoustic-electric transducer with two cavities. A diaphragm of the second-order bandpass diaphragm 1421 may be used to convert a change of sound pressure caused by an audio signal on the diaphragm surface into a mechanical vibration of the diaphragm. The capacitance detection circuit 1431 may be used to detect the change of a capacitance between the diaphragm and a plate caused by the vibration of the diaphragm. The amplification circuit 1432 may be used to adjust the amplitude of the output voltage. A sound hole may be provided in a first chamber, and the sound hole may be provided with an acoustic resistance material as needed. A second chamber may be closed. The acoustic impedance of the sound hole and the surrounding air may be inductive. The resistive material may have acoustic impedance. The first chamber may have capacitive acoustic impedance. The second chamber may have capacitive acoustic impedance. As used herein, the first chamber may also be referred to as a front chamber, and the second chamber may be referred to as a rear chamber.

Figure 14B:
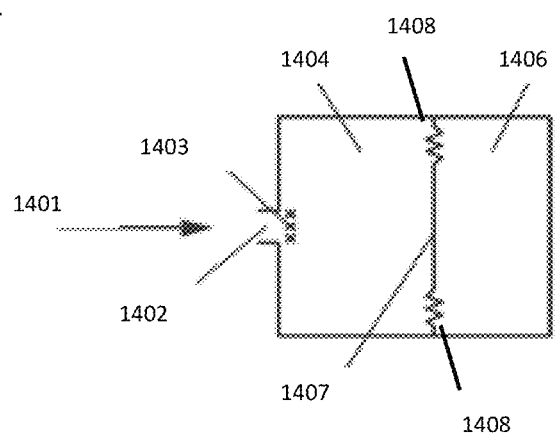
FIG. 14B is a schematic diagram of an exemplary acoustic force generator of the acoustic-electric transducer shown in FIG. 14A according to some embodiments of the present disclosure.

FIG. 14B is a schematic diagram of an exemplary acoustic force generator of the acoustic-electric transducer shown in FIG. 14A according to some embodiments of the present disclosure.

The acoustic force generator may detect an audio signal 1401, and may include a first chamber 1404 and a second chamber 1406. The first chamber 1404 may include a sound hole 1402 and a sound resistance material 1403 embedded in the sound hole 1402. The first chamber 1404 and the second chamber 1406 may be separated by a diaphragm 1407. The diaphragm 1407 may connect an elastic component 1408.

Figure 14C:
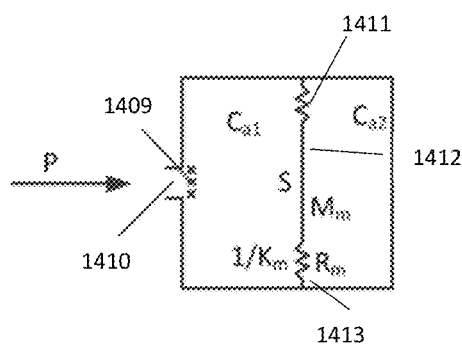
FIG. 14C is a schematic diagram of an exemplary structure of the acoustic force generator shown in FIG. 14B according to some embodiments of the present disclosure.

FIG. 14C is a schematic diagram of an exemplary structure of the acoustic force generator shown in FIG. 14B according to some embodiments of the present disclosure. As shown in FIG. 14C, sound pressure P may pass through an acoustic resistance material 1409 embedded in a sound hole 1410. The sound pressure P may be converted into a vibration of a diaphragm 1412. Prefers to the sound pressure arriving at the microphone, $R_{a1}$ refers to the sound resistance of the acoustic material 1409, $M_{a1}$ refers to the mass near the sound hole 1410, $C_{a1}$ refers to the sound capacity of the first chamber, S is an effective area of the diaphragm 1412, $R_m$ refers to damping of the diaphragm 1412, $M_m$ refers to the mass of the diaphragm 1412, $K_m$ refers to the elastic modulus of the diaphragm 1412, and $C_{a2}$ refers to the sound capacity of the first chamber.

Figure 14D:
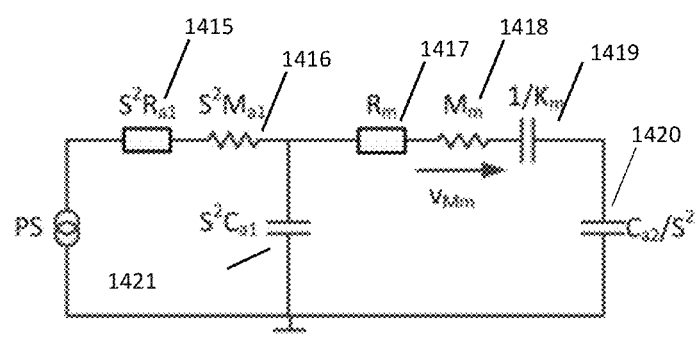
FIG. 14D is a schematic diagram of an equivalent circuit of the structure shown in FIG. 14C according to some embodiments of the present disclosure.

FIG. 14D is a schematic diagram of an exemplary circuit of the structure shown in FIG. 14B and FIG. 14C according to some embodiments of the present disclosure. In the circuit, a resistor 1415 (with a resistance $S^2R_a$) and an inductor 1416 (with an inductance $S^2M_a$) may indicate the acoustic resistance and the acoustic mass of the sound hole 1410. A capacitor 1421 (with a capacitance $S^2C_{a1}$) may indicate the acoustic capacitance of the first chamber 1404. A capacitor 1420 (with a capacitance $C_{a2}/S^2$) may indicate the acoustic capacitance of the second chamber 1406. A resistor 1417 (with a resistance $R_m$), an inductor 1418 (with an inductance $M_m$), and a capacitor 1419 (with a capacitance $C_m$) may indicate the resistance of the diaphragm 1407, the mass of the diaphragm 1407, and the elasticity coefficient of the diaphragm 1407, respectively.

In the circuit, circuit current corresponds to a vibration velocity of the diaphragm 1412. The vibration velocity $v_{Mm}$ may be determined according to Equation (10) as follows:

$$v_{Mm} = PS \cdot \frac{Z_2}{Z_1 + Z_2} \cdot \frac{1}{A} = P \cdot \frac{1}{(R_{a1} + j\omega M_{a1})(j\omega C_{a1} \cdot A + 1) + A}, \quad (10)$$

where ω refers to the angular frequency of the acoustic structure (e.g., the acoustic force structure illustrated in FIG. 14C), j refers to an unit imaginary number, $Z_1$ refers to the acoustic impedance of the resistor 1415 and the inductor 1416, $Z_2$ refers to the acoustic impedance of the resistor 1417, the inductor 1418, the capacitor 1419, and the capacitor 1420, the descriptions of P, S, $R_{a1}$, $M_{a1}$, and $C_{a1}$ may be found in FIG. 14C and descriptions thereof, and A may be determined according to Equation (11) as follows:

$$A = R_m + j\omega M_m + \frac{K_m + \frac{1}{C_{a2}}}{j\omega} \quad (11)$$

where ω refers to the angular frequency of the acoustic structure (e.g., the acoustic force structure illustrated in FIG. 14C), j refers to an unit imaginary number, and the descriptions of $R_m$, $M_m$, $K_m$, and $C_{a2}$ may be found in FIG. 14C and descriptions thereof.

Further, a capacitance change output by the system is related to a distance between the diaphragm and the plate, and the distance between the diaphragm and the plate is related to deformation of the diaphragm (displacement of the diaphragm). Therefore, the displacement of the diaphragm may be determined according to Equation (12) as follows:

$$S_{Mm}(t) = \int v_{Mm}(t)dt \quad (12)$$

$$= \frac{1}{(R_{a1} + j\omega M_{a1})(j\omega C_{a1} \cdot A + 1) + A} \cdot e^{j\omega t} dt$$

-continued $$= PSe^{j\omega t} \cdot \frac{1}{j\omega} \cdot \frac{1}{(R_{a1} + j\omega M_{a1})(j\omega C_{a1} \cdot A + 1) + A},$$

Wherein the descriptions of P, S, $R_{a1}$, $M_{a1}$, and $C_{a1}$ may be found in FIG. 14C and descriptions thereof.

A transfer function of the system may be determined according to equation (13) as follows:

$$\frac{S_{Mm}}{PSe^{j\omega t}} = \frac{1}{j\omega} \cdot \frac{1}{(R_{a1} + j\omega M_{a1})(j\omega C_{a1} \cdot A + 1) + A}, \quad (13)$$

where ω refers to the angular frequency of the acoustic structure (e.g., the acoustic force structure illustrated in FIG. 14C), j refers to an unit imaginary number, and the descriptions of $R_{a1}$, $M_{a1}$, and $C_{a1}$ may be found in FIG. 14C and descriptions thereof.

By performing a Laplace transform, the transfer function may be expressed as follows:

$$G(s) = \frac{1}{a_4 s^4 + a_3 s^3 + a_2 s^2 + a_1 s + a_0}, \quad (14)$$

where $$a_0 = K_m + \frac{s^2}{c_{a2}}, \quad (15)$$

$$a_1 = R_m + S^4 R_{a1} K_m C_{a1} + \frac{S^6 R_{a1} C_{a1}}{C_{a2}} + S^2 R_{a1}, \quad (16)$$

$$a_2 = M_m + S^4 R_{a1} R_m C_{a1} + S^4 M_{a1} K_m C_{a1} + \frac{S^6 M_{a1} C_{a1}}{c_{a2}} + S^2, \quad (17)$$

$$a_3 = S^4 M_m R_{a1} C_{a1} + S^4 M_{a1} R_m C_{a1}, \quad (18)$$

$$a_4 = S^4 M_{a1} M_m C_{a1}. \quad (19)$$

As a result, a combination of the first chamber corporate with a sound hole may function as a multi-order bandpass filter (e.g., a second-order bandpass filter), and a combination of the second chamber, which a closed-chamber and the diaphragm may function as a second-order bandpass filter. The diaphragm, which may function as an acoustic-sensitive element, may convert the audio signal into a change of a capacitance between the diaphragm and the plate. In some embodiments, a fourth-order system may be formed by combining the acoustic channel component and the acoustic-sensitive component.

An acoustic-electric transducer constructed in accordance with the above-described configuration may function as a bandpass filter. A plurality of the acoustic-electric transducers with different filtering characteristics may be set in the acoustic-electric transducing module 210 to form a filter group, which may generate a plurality of sub-band signals according to the audio signal. In some embodiments, the acoustic-electric transducer may be adjusted to a non-underdamping state through adjustment of damping of the acoustic resistance material and the diaphragm of the acoustic-electric transducer. A frequency bandwidth of each acoustic-electric transducer may be set to increase as a center frequency increases.

Figure 15:
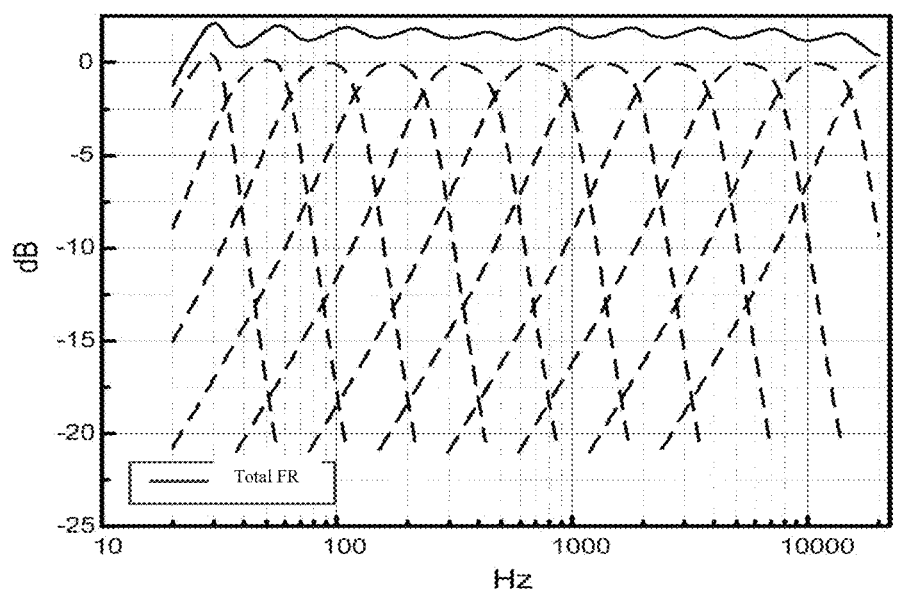
FIG. 15 illustrates an exemplary frequency response of an acoustic-electric transducing module according to some embodiments of the present disclosure.

FIG. 15 illustrates an exemplary frequency response of an acoustic-electric transducing module according to some embodiments of the present disclosure. The acoustic-electric transducing module may include 11 acoustic-electric transducers. 11 dotted lines in FIG. 15 represent the frequency responses of the individual 11 acoustic-electric transducers. The solid line in FIG. 15 may indicate the frequency response of the acoustic-electric transducing module. As illustrated above, multiple acoustic-electric transducers, each of which may function as a bandpass filter for an audio signal, may be arranged in the same acoustic-electric transducing module, and generate sub-band signals according to an audio signal. As shown in FIG. 15, frequency responses of the eleven acoustic-electric transducers may cover the audible frequency band of the human ear 20 Hz-20 kHz, only the frequency band 20 Hz-10 kHz is shown in FIG. 15. The frequency responses of the 11 acoustic-electric transducers may intersect at frequency points with energies that range from −1 dB to −5 dB, and the frequency response of the acoustic-electric transducing module may have a power level fluctuation within +1 dB.

Figure 16A:
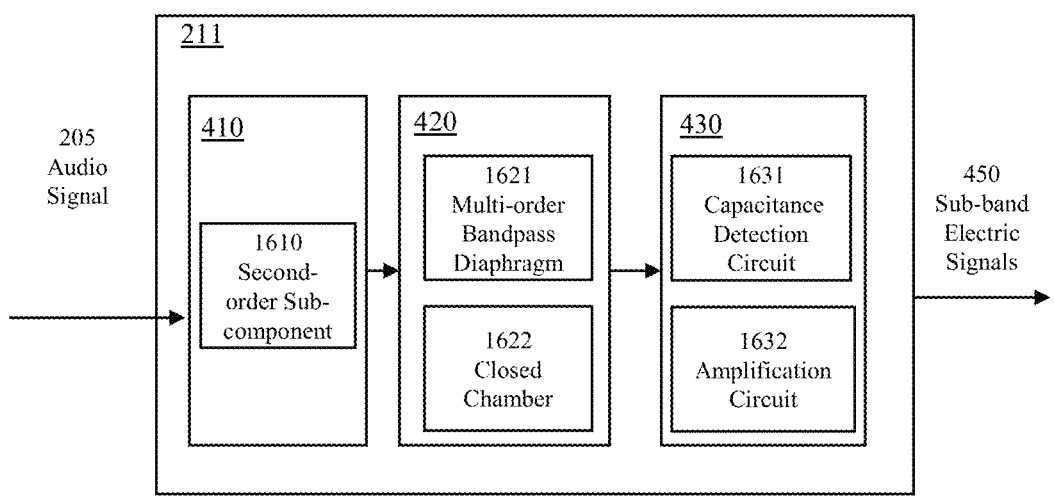
FIG. 16A is a schematic diagram of an exemplary acoustic-electric transducer according to some embodiments of the present disclosure.

FIG. 16A is a schematic diagram of an exemplary acoustic-electric transducer 211 according to some embodiments of the present disclosure. The acoustic-electric transducer 211 may include an acoustic channel component 410, a sound sensitive component 420, and a circuit component 430. The acoustic channel component 410 may include a second-order component 1610. The sound sensitive component 420 may be a multi-order bandpass diaphragm 1621, and a closed chamber 1622. The circuit component 430 may include a capacitance detection circuit 1631, and an amplification circuit 1632.

The acoustic-electric transducer 211 may be an air-conduction acoustic-electric transducer with two cavities. A diaphragm of the multi-order bandpass diaphragm 1621 may be used to convert sound pressure change caused by an audio signal 205 on the diaphragm surface into a mechanical vibration of the diaphragm. The capacitance detection circuit 1631 may be used to detect a change of a capacitance between the diaphragm and a plate caused by the vibration of the diaphragm. The amplification circuit 1632 may be used to adjust an output voltage to a suitable amplitude. A sound hole may be provided in a first chamber, and the sound hole may be provided with an acoustic resistance material as required. A second chamber may be closed.

Figure 16B:
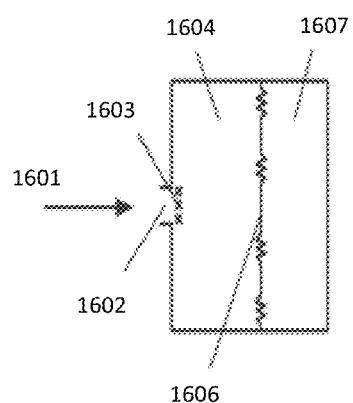
FIG. 16B is a schematic diagram of an exemplary acoustic force generator of the acoustic-electric transducer shown in FIG. 16A according to some embodiments of the present disclosure.

FIG. 16B is a schematic diagram of an exemplary acoustic force generator of the acoustic-electric transducer shown in FIG. 16A according to some embodiments of the present disclosure.

As described in connection with FIG. 14A, the first chamber with the sound hole may function as a second-order bandpass filter. In some embodiments, the diaphragm is configured as a composed vibration system. A system including the diaphragm and the second chamber (or referred to as the closed chamber) may function as a high-order (larger than second-order) bandpass filter. In some embodiments, the acoustic-electric transducer illustrated in FIG. 16B may have a higher order than the acoustic-electric transducer illustrated in FIG. 14A.

Figure 17:
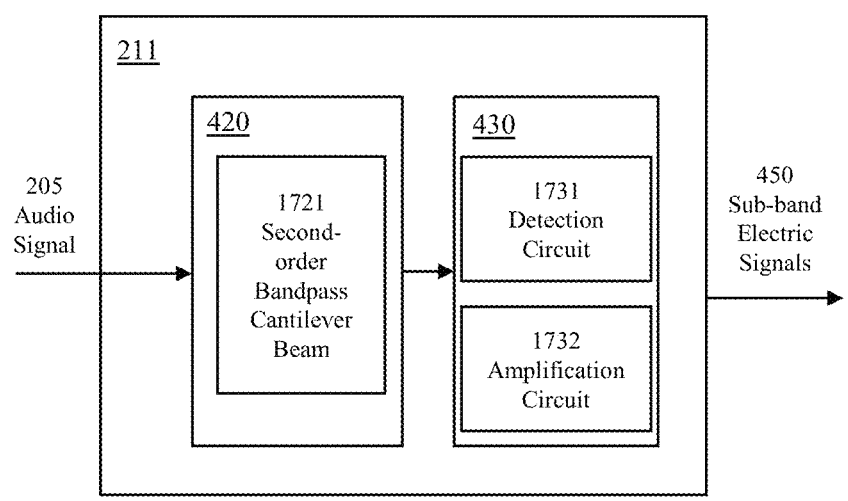
FIG. 17 is a schematic diagram of an exemplary acoustic-electric transducer according to some embodiments of the present disclosure.

FIG. 17 is a schematic diagram of an exemplary acoustic-electric transducer according to some embodiments of the present disclosure.

The acoustic-electric transducer 211 may include a sound sensitive component 420, and a circuit component 430. The sound sensitive component 420 may include a second-order bandpass cantilever 1721. The circuit component 430 may include a detection circuit 1731, and an amplification circuit in 1732.

A cantilever may obtain audio signals transmitted to the cantilever, and cause changes of electric parameters of a cantilever material. The audio signal may include an air-conduction signal, a bone-conduction signal, a hydro audio signal, a mechanical vibration signal, or the like, or a combination thereof. The cantilever material may include a piezoelectric material. The piezoelectric material may include a piezoelectric ceramic or piezoelectric polymers. The piezoelectric ceramic may include PZT. The detection circuit 1731 may detect changes of electric signals of the cantilever material. The amplification circuit 1732 may adjust the amplitudes of the electric signals.

According to a circuit corresponding to the cantilever (which is similar to the circuit corresponding to the diaphragm in FIG. 6C), an impedance of the cantilever may be determined according to Equation (20) as follows:

$$Z = R + j\left(\omega M - \frac{K}{\omega}\right), \quad (20)$$

Where Z refers to the impedance of the cantilever, ω refers to the angular frequency of the acoustic structure (e.g., the cantilever), j refers to an unit imaginary number, R refers to damping of the cantilever, M refers to the mass of the cantilever, and K refers to then elasticity coefficient of the cantilever.

In some embodiments, the cantilever may function as a second-order system, and a angular frequency may be determined according to Equation (21) as follows:

$$\omega_0 = \sqrt{\frac{K}{M}}, \quad (21)$$

where $\omega_0$ refers to the angular frequency, M refers to the mass of the cantilever, and K refers to then elasticity coefficient of the cantilever.

Cantilever vibration may have a resonant peak at its angular frequency. Thus, the audio signal may be filtered using the cantilever. Further, when a filter bandwidth is calculated at a half-power point, corresponding cutoff frequencies may be determined according to Equation (22) and Equation (23) as follows:

$$\omega_1 = \frac{\sqrt{R^2 + 4MK} - R}{2M}, \quad (22)$$

$$\omega_2 = \frac{\sqrt{R^2 + 4MK} \mp R}{2M}, \quad (23)$$

where R refers to damping of the cantilever, M refers to the mass of the cantilever, and K refers to then elasticity coefficient of the cantilever.

A quality factor of the cantilever filtering (referred as Q below) may be determined according to Equation (24) as follows:

$$Q = \frac{\omega_0}{\omega_2 - \omega_1} = \frac{\sqrt{MK}}{R}, \quad (24)$$

where R refers to damping of the cantilever, M refers to the mass of the cantilever, and K refers to then elasticity coefficient of the cantilever.

It can be seen that, after the angular frequency (center frequency) of the cantilever filter is determined, the quality factor Q of the cantilever filtering may be changed by adjusting the damping R. The smaller the damping R is, the larger the quality factor R is, the narrower the filter bandwidth is, and the sharper a filter frequency response curve is.

Figure 18:
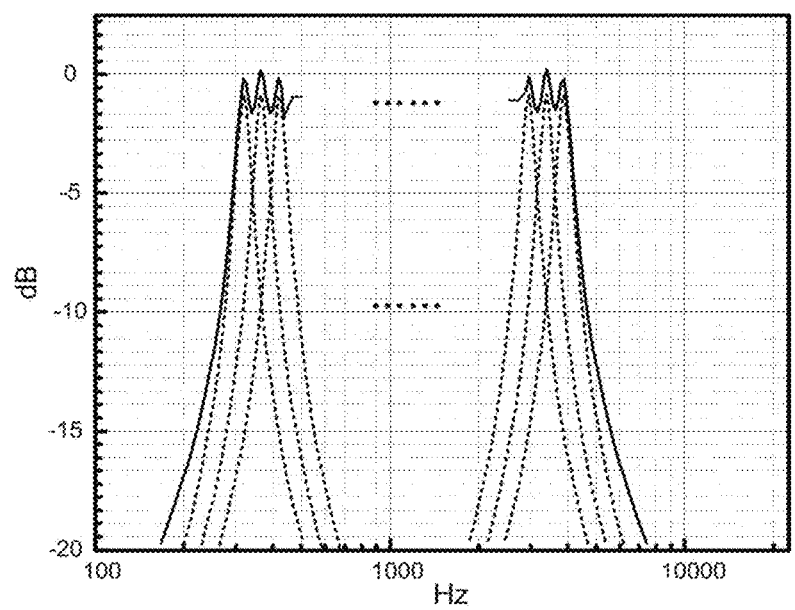
FIG. 18 illustrates an exemplary frequency response of an acoustic-electric transducing module according to some embodiments of the present disclosure.

FIG. 18 illustrates an exemplary frequency response of the acoustic-electric transducing module according to some embodiments of the present disclosure.

The acoustic-electric transducing module may include 19 acoustic-electric transducers. 19 dashed lines in FIG. 18 may represent the frequency responses of the 19 acoustic-electric transducers respectively. The solid line in FIG. 18 may indicate the frequency response of the acoustic-electric transducing module. As illustrated above, multiple acoustic-electric transducers, each of which may function as a bandpass filter for an audio signal, may be arranged in a same acoustic-electric transducing module, and generate sub-band signals according to an audio signal. As shown in FIG. 18, frequency responses of the 19 acoustic-electric transducers may cover a frequency band of 300 Hz-4000 Hz. The frequency response of the acoustic-electric transducing module may have a power level fluctuation within +1 dB.

Figure 19A:
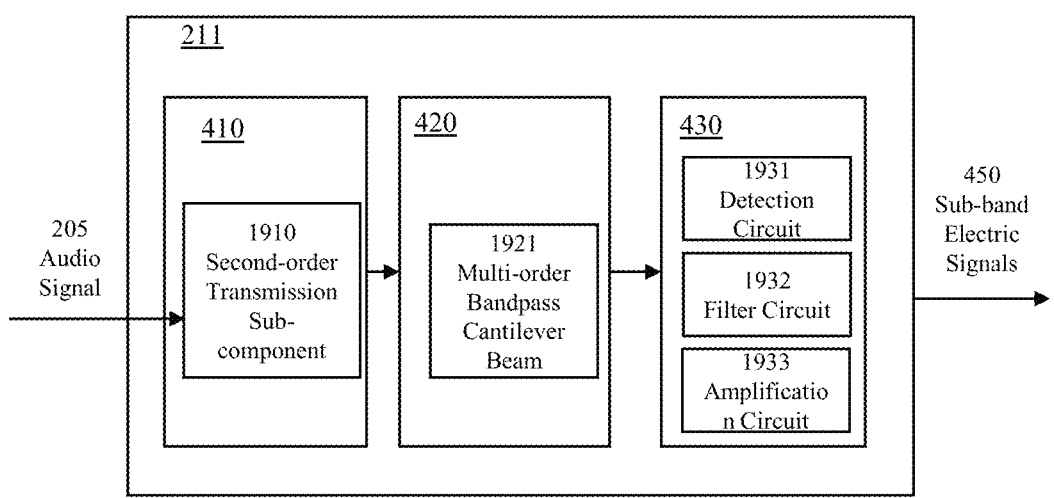
FIG. 19A is a schematic diagram of an exemplary acoustic-electric transducer according to some embodiments of the present disclosure.

FIG. 19A is a schematic diagram of an exemplary acoustic-electric transducer according to some embodiments of the present disclosure. The acoustic-electric transducer 211 may include an acoustic channel component 410, a sound sensitive component 420, and a circuit component 430. The acoustic channel component 410 may include a second-order transmission sub-component 1910. The sound sensitive component 420 may a multi-order bandpass cantilever 1921. The circuit component 430 may include a detection circuit 1931, a filter circuit 1932, and an amplification circuit 1933.

A cantilever may obtain an audio signal, and cause changes of electric parameters of a cantilever material. The audio signal may include an air-conduction signal, a bone-conduction signal, a hydro audio signal, a mechanical vibration signal, etc. The cantilever material may include a piezoelectric material. The piezoelectric material may include a piezoelectric ceramic or piezoelectric polymers. The piezoelectric ceramic may include PZT. The detection circuit 1931 may detect changes of electric signals of the cantilever material. The amplification circuit 1933 may adjust the amplitude of the electric signals. In some embodiments, the suspension structure is connected with a base through an elastic member, and vibration of bone conduction audio signals acts on the suspension structure. The suspension structure and the corresponding elastic member may transmit the vibration to the cantilever and constitute an acoustic channel for transmitting the audio signal, which may function as a second-order bandpass filter. The cantilever attached to the suspension structure may also function as a second-order bandpass filter.

Figure 19B:
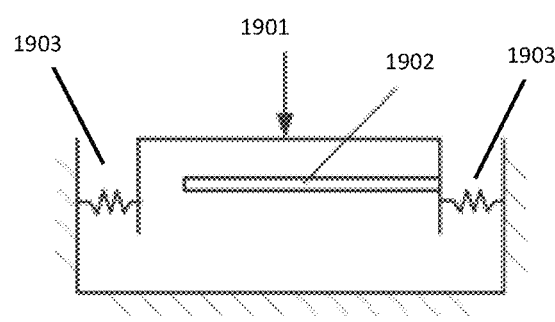
FIG. 19B is a schematic diagram of an exemplary cantilever according to some embodiments of the present disclosure.

FIG. 19B is a schematic diagram of an exemplary cantilever according to some embodiments of the present disclosure. As shown in FIG. 19B, a cantilever 1902 may connect to an elastic component 1903. An audio signal arriving at the elastic component (e.g., the elastic component 1903) may cause vibrations of the elastic component. The elastic component may transmit the vibrations to the cantilever 1902. The elastic component and the cantilever 1902 may be arranged in a same acoustic-electric transducing module 210, which may function as a second-order bandpass filter. The cantilever can obtain an audio signal 1900 and cause changes in electric parameters of a cantilever material.

Figure 19C:
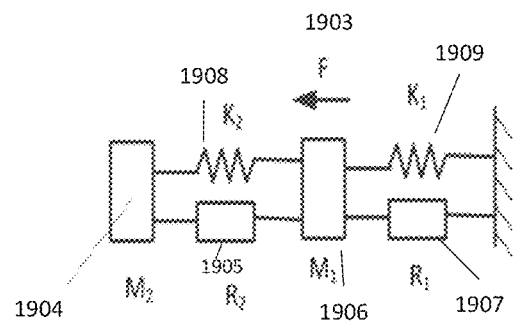
FIG. 19C is a schematic diagram of an exemplary mechanical model corresponding to the sound sensitive component according to some embodiments of the present disclosure.

FIG. 19C is a schematic diagram of an exemplary mechanical model corresponding to the sound sensitive component 420 according to some embodiments of the present disclosure. The mechanical model may include a first cantilever 1902, a second cantilever 1901, a first elastic component 1908, a second elastic component 1909, a first damping component 1905, and a second damping component 1907. An end of the second elastic component 1909 may be fixed. An end of the second damping component 1907 may be fixed.

Figure 19D:
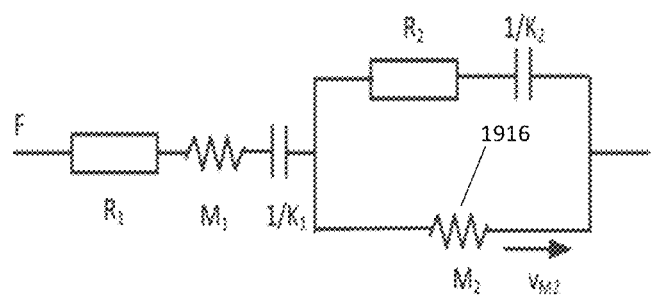
FIG. 19D is a schematic diagram of an exemplary equivalent circuit of the mechanical model shown in FIG. 19C according to some embodiments of the present disclosure.

FIG. 19D is a schematic diagram of an exemplary circuit of the mechanical model shown in FIG. 19C according to some embodiments of the present disclosure.

An impedance of the system (referred to as Z below) to the inputted signal may be determined according to Equation (25) as follows:

$$Z = Z_1 + Z_2 = R_1 + j\left(\omega M_1 - \frac{K_1}{\omega}\right) + \frac{j\omega M_2 R_2 + M_2 K_2}{R_2 + \left(\omega M_2 \frac{K_2}{\omega}\right)}, \quad (25)$$

where ω refers to the angular frequency of the acoustic structure (e.g., the cantilever), j refers to an unit imaginary number, $Z_1$ refers to the impedance of the second cantilever 1901, $Z_2$ refers to the impedance of the first cantilever 1902, $R_1$ refers to the acoustic resistance of the second cantilever 1901, $R_2$ refers to the acoustic resistance of the first cantilever 1902, $M_1$ refers to the mass of the second cantilever 1901, $M_2$ refers to the mass of the first cantilever 1902, $K_1$ refers to the elastic modulus of the second cantilever 1901, and $K_2$ refers to the elastic modulus of the first cantilever 1902.

The amplitude of the current in the circuit may correspond to a vibration velocity of the cantilever $M_2$; therefore, the vibration velocity $v_{M2}$ of the cantilever $M_2$ may be determined according to Equation (26) and Equation (27) as follows:

$$v_{M2} = F \cdot \frac{Z_2}{Z_1 + Z_2} / j\omega M_2, \quad (26)$$

$$= F \cdot \frac{R_2 + \frac{K_2}{j\omega}}{\left[\left[R_1 + j\left(\omega M_1 - \frac{K_1}{\omega}\right)\right]\left[R_2 + j\left(\omega M_2 - \frac{K_2}{\omega}\right)\right] + j\omega M_2 R_2 + M_2 K_2\right]}, \quad (27)$$

where F refers to the sound force of an audio signal received, ω refers to the angular frequency of the acoustic structure (e.g., the cantilever), j refers to an unit imaginary number, $Z_1$ refers to the acoustic impedance of the second cantilever 1901, $Z_2$ refers to the acoustic impedance of the first cantilever 1902, $R_1$ refers to the acoustic resistance of the second cantilever 1901, $R_2$ refers to the acoustic resistance of the first cantilever 1902, $M_1$ refers to the mass of the second cantilever 1901, $M_2$ refers to the mass of the second cantilever 1901, $K_1$ refers to the elastic modulus of the second cantilever 1901, and $K_2$ refers to the elastic modulus of the first cantilever 1902.

In some embodiments, the displacement $s_{M2}$ of the cantilever under the audio signal may be determined according to Equation (28) and Equation (29) as follows:

$$S_{M2} = \int v_{M2} \cdot e^{j\omega t} dt = \frac{1}{j\omega} \cdot v_{M2} \cdot e^{j\omega t} \quad (28)$$

$$= F \cdot e^{j\omega t} \cdot \frac{\left(R_2 + \frac{K_2}{j\omega}\right) \cdot \frac{1}{j\omega}}{\left[\left[R_1 + j\left(\omega M_1 - \frac{K_1}{\omega}\right)\right]\left[R_2 + j\left(\omega M_2 - \frac{K_2}{\omega}\right)\right] + j\omega M_2 R_2 + M_2 K_2\right]}, \quad (29)$$

where F refers to the sound force of an audio signal received, ω refers to the angular frequency of the acoustic structure (e.g., the cantilever), j refers to an unit imaginary number, $R_1$ refers to the acoustic resistance of the second cantilever 1901, $R_2$ refers to the acoustic resistance of the first cantilever 1902, $M_1$ refers to the mass of the second cantilever 1901, $M_2$ refers to the mass of the second cantilever 1901, $K_1$ refers to the elastic modulus of the second cantilever 1901, and $K_2$ refers to the elastic modulus of the first cantilever 1902.

By performing a Laplace transform, the transfer function may be expressed as follows:

$$G(s) = \frac{R_2 s + K_2}{a_4 s^4 + a_3 s^3 + a_2 s^2 + a_1 s + a_0}, \quad (30)$$

and where $$a_0 = K_1 K_2, \quad (31)$$

$$a_1 = R_1 K_2 + R_2 K_1, \quad (32)$$

$$a_2 = R_1 R_2 + M_1 K_2 + M_2 K_1 + M_2 K_2, \quad (33)$$

$$a_3 = R_1 M_2 + R_2 M_1 + M_2 R_2, \quad (34)$$

$$a_4 = M_1 M_2. \quad (35)$$

It can be known from the transfer function that it is a fourth-order system, and an order of the band-pass filter can be increased by the above setting method. In addition, the filter circuit 1932 may be added in the circuit component 430 so that corresponding electric signal may be filtered. The above setting may cause a slope of the filtering frequency response edge of the sound-electric transducer to the audio signal to be larger, and filtering effect to be better.

Figure 20A:
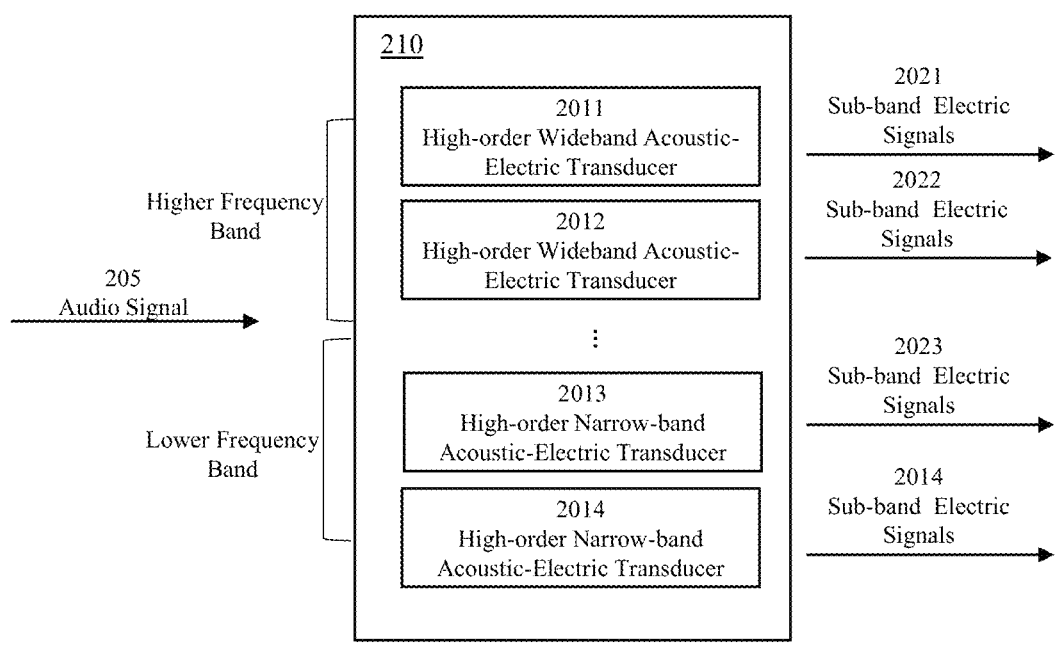
FIG. 20A is a schematic diagram of an exemplary acoustic-electric transducing module according to some embodiments of the present disclosure.

FIG. 20A is a schematic diagram of an exemplary acoustic-electric transducing module 210 according to some embodiments of the present disclosure.

The acoustic-electric transducing module 210 may generate sub-band signals according to an audio signal using a plurality of acoustic-electric transducers. The acoustic-electric transducers may function as bandpass filters. For different frequency bands to be processed, corresponding acoustic-electric transducers may be set to have a different frequency response. In some embodiments, the bandwidths of the acoustic-electric transducers in the acoustic-electric transducing module 210 may be different. The bandwidth of the acoustic-electric transducer may be set to increase with its center frequency. In some embodiments, the acoustic-electric transducer may be a high-order acoustic-electric transducer. In some embodiments, for a low-middle frequency band, the corresponding acoustic-electric transducer may be high-order narrow-band. In a middle-high frequency band, the acoustic-electric transducer may be high-order wideband.

As shown in FIG. 20A, the acoustic-electric transducing module 210 may include one or more high-order wideband acoustic-electric transducers (e.g., a high-order wideband acoustic-electric transducer 2011, 2012, etc.) in a middle-high frequency band, and one or more high-order narrow-band acoustic-electric transducers (e.g., a high-order narrow-band acoustic-electric transducer 2013, 2014, etc.) in a low-middle frequency band.

The acoustic-electric transducing module 210 may obtain an audio signal 205, and output a plurality of sub-band electric signals, e.g., sub-band electric signals 2021, 2022, 2023, . . . , 2024.

Figure 20B:
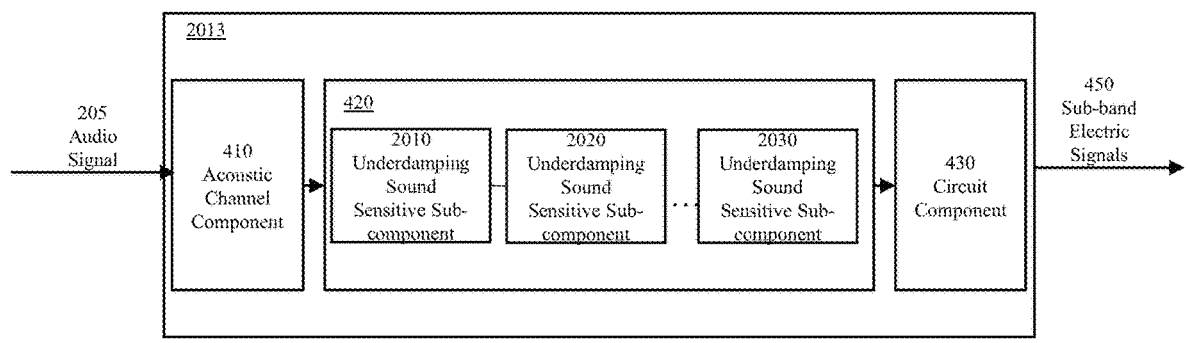
FIG. 20B is a schematic diagram of an exemplary high-order narrow-band acoustic-electric transducer according to some embodiments of the present disclosure.

FIG. 20B is a schematic diagram of an exemplary high-order narrow-band acoustic-electric transducer according to some embodiments of the present disclosure.

As shown in FIG. 20B, the high-order narrow-band acoustic-electric transducer 2013 may include an acoustic channel component 410, a sound sensitive component 420, and a circuit component 430.

The sound sensitive component 420 may include a plurality of underdamping sound-sensitive sub-components (e.g., underdamping sound-sensitive sub-components 2010, 2030, . . . , 2050). The plurality of underdamping sound-sensitive sub-components may be connected in series. Center frequencies of the underdamping sound-sensitive sub-components may be the same or close to each other. Multiple underdamping sound-sensitive sub-components being connected in series may increase the order of filtering characteristics of the sound sensitive component 420. Each underdamping sound-sensitive sub-component may reduce bandwidth and achieve narrow-band filtering. In some embodiments, the transducer may function as a high-order narrow-band acoustic-electric transducer. As shown in FIG. 20B, the high-order narrow-band acoustic-electric transducer 2013 may obtain an audio signal 205 and output a sub-band electric signal 450 based on the audio signal 205.

Figure 20C:
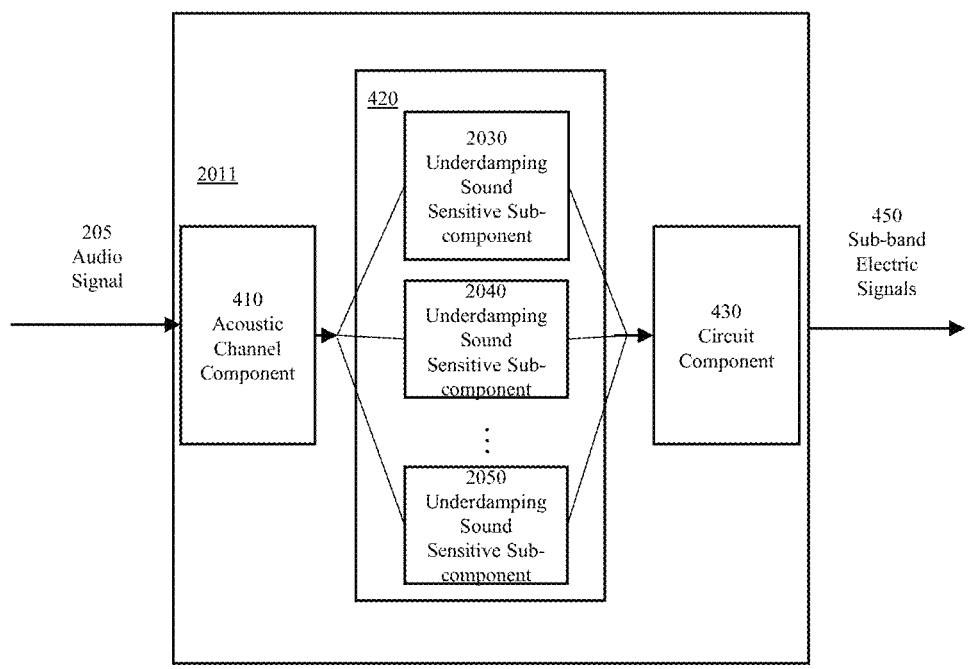
FIG. 20C is a schematic diagram of an exemplary high-order wideband acoustic-electric transducer according to some embodiments of the present disclosure.

FIG. 20C is a schematic diagram of an exemplary high-order wideband acoustic-electric transducer according to some embodiments of the present disclosure.

As shown in FIG. 20C, the high-order wideband acoustic-electric transducer 2011 may include an acoustic channel component 410, a sound sensitive component 420, and a circuit component 430. The sound sensitive component 420 may include a plurality of underdamping sound-sensitive sub-components (e.g., an underdamping sound-sensitive sub-component 2020, 2040, . . . , 2060). The plurality of underdamping sound-sensitive sub-components may be connected in parallel. Center frequencies of underdamping sound-sensitive sub-components may be different. The parallel connection of multiple underdamping sound-sensitive sub-components may broaden a bandwidth of the sound sensitive component 420. In some embodiments, the high-order narrow-band acoustic-electric transducer 2011 may function as a high-order wideband acoustic-electric transducer. As shown in FIG. 20C, the high-order narrow-band acoustic-electric transducer 2011 may obtain an audio signal 205 and output a sub-band electric signal 450 accordingly.

Figure 21A:
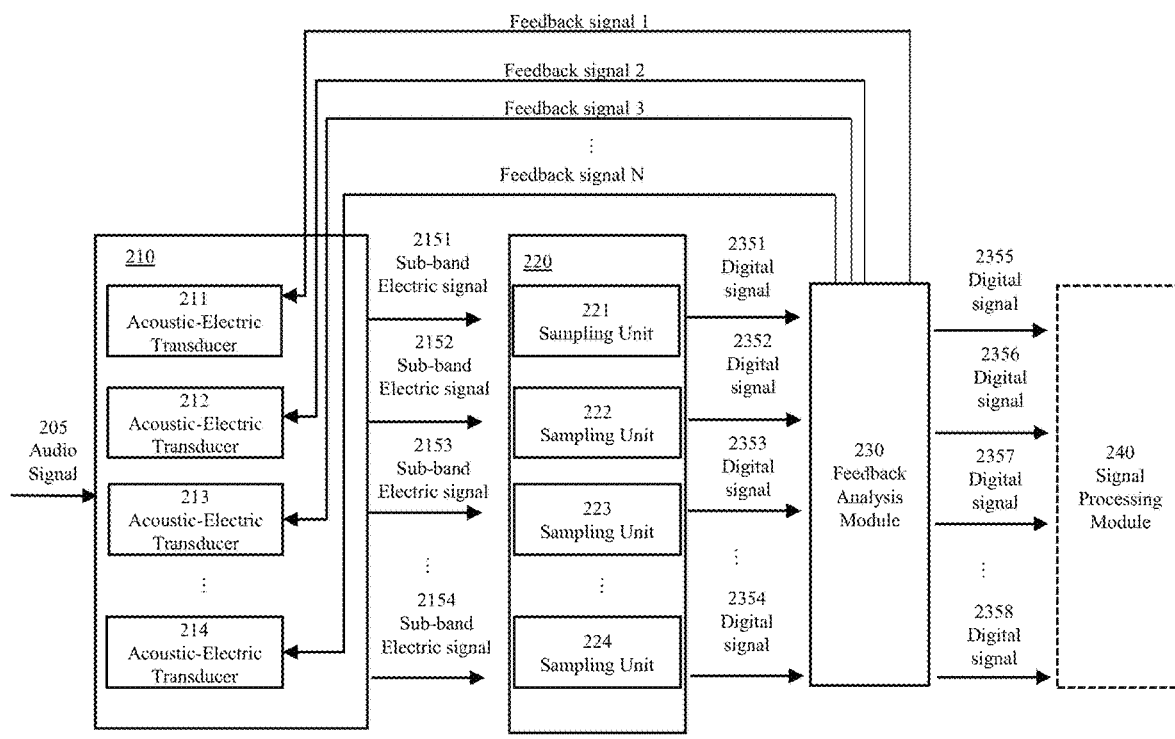
FIG. 21A is a schematic diagram of an exemplary signal processing device according to some embodiments of the present disclosure.

FIG. 21A is a schematic diagram of an exemplary signal processing device 2100 according to some embodiments of the present disclosure. The signal processing device 2100 may include an acoustic-electric transducing module 210, a plurality of sampling modules (e.g., sampling units 221, 222, 223, . . . , 224), a feedback analysis module 230 (or referred to as a feedback module), and a signal processing module 240. The acoustic-electric transducing module 210 may include a plurality of acoustic-electric transducers, (e.g., an acoustic-electric transducer 211, 212, 213, . . . 214).

As shown in FIG. 21A, the acoustic-electric transducing module 210 may obtain an audio signal 205, and output a plurality of sub-band electric signals (e.g., sub-band electric signals 2152, 2152, 2153, . . . , 2154.

Each of the plurality of acoustic-electric transducer may convert the audio signal 205 into a sub-band electric signal and output a corresponding sub-band electric signal.

Each of the plurality of sampling modules may sample a corresponding sub-band electric signal, convert the sub-band electric signal into a digital signal, and output the digital signal.

The feedback analysis module 230 may obtain a plurality of digital signals transmitted by the plurality of sampling modules. The feedback analysis module 230 may analyze each digital signal corresponding to the sub-band electric signal, output a plurality of feedback signals (e.g., feedback signals 1, 2, 3, . . . , N) and transmit each feedback signal to a corresponding acoustic-electric transducer. The corresponding acoustic-electric transducer may adjust its parameters based on the feedback signal.

The signal processing module 240 may obtain a plurality of digital signals (e.g., digital signals 2355, 2356, 2357, 2358) transmitted by the feedback analysis module 230. A transmission mode of digital signals may be separately output through different parallel lines or may share one line according to a specific transmission protocol.

Figure 21B:
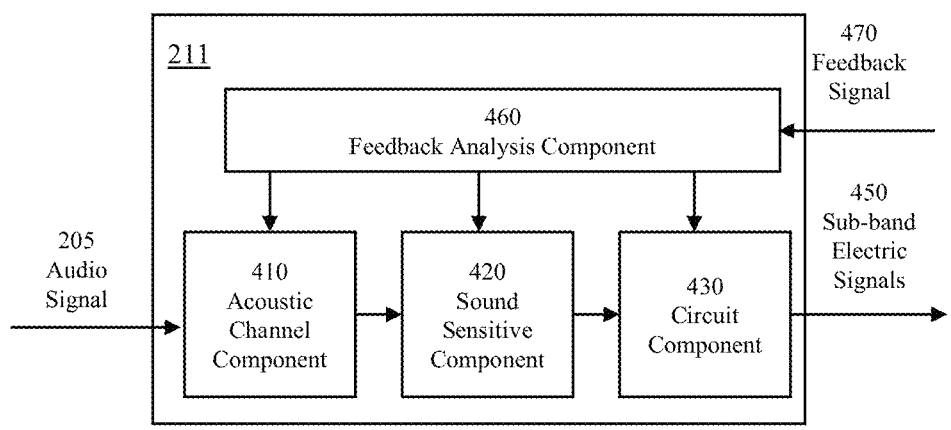
FIG. 21B is a schematic diagram of an exemplary acoustic-electric transducer according to some embodiments of the present disclosure.

FIG. 21B is a schematic diagram of an exemplary acoustic-electric transducer 211 according to some embodiments of the present disclosure. The acoustic-electric transducer 211 may include an acoustic channel component 410, a sound sensitive component 420, a circuit component 430, and a feedback processing component 460.

The feedback processing component 460 may be configured to obtain a feedback signal 470 from the feedback analysis module 230 and adjust parameters of the acoustic-electric transducer 211.

In some embodiments, the feedback processing component 460 may adjust at least one of the acoustic channel component 410, the sound sensitive component 420, and the circuit component 430.

In some embodiments, the feedback processing component 460 may adjust parameters (e.g., size, position, and connection manner) of the acoustic channel component to adjust filtering characteristics of the acoustic channel component 410 using electromechanical control systems. Exemplary electromechanical control systems may include pneumatic mechanisms, motor-driven mechanisms, hydraulic actuators, or the like, or a combination thereof.

In some embodiments, the feedback processing component 460 may adjust parameters (e.g., size, position, or connection manner) of the sound sensitive component 420 to adjust filtering characteristics of the sound sensitive component using electromechanical control systems.

In some embodiments, the feedback processing component 460 may include a feedback circuit that is directly coupled to the circuit component 430 to adjust the circuit component 430.

Figure 22:
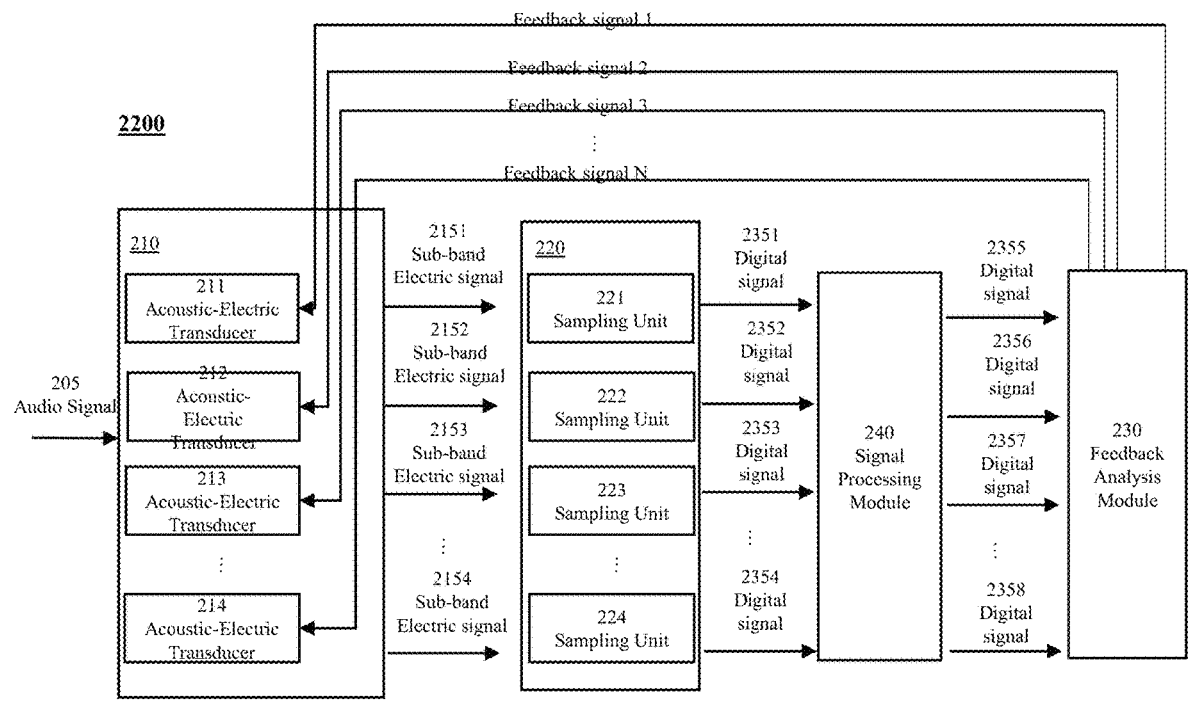
FIG. 22 is a schematic diagram of an exemplary signal processing device according to some embodiments of the present disclosure.

FIG. 22 is a schematic diagram of an exemplary signal processing device 2200 according to some embodiments of the present disclosure. The signal processing device 2200 may include an acoustic-electric transducing module 210, a plurality of sampling units (e.g., sampling units 221, 222, . . . , and 224), a feedback analysis module 230, and a signal processing module 240.

The acoustic-electric transducing module 210 may include a plurality of acoustic-electric transducers, (e.g., acoustic-electric transducers 211, 212, 213, . . . 214).

As shown in FIG. 22, the acoustic-electric transducing module 210 may obtain an audio signal 205 and output a plurality of sub-band electric signals (e.g., sub-band electric signals 2152, 2152, 2153, . . . , 2154).

Each of the plurality of acoustic-electric transducer may convert the audio signal 205 into a corresponding sub-band electric signal output the corresponding sub-band electric signal. Each of the plurality of sampling units may sample a corresponding sub-band electric signal, convert the sub-band electric signal into a digital signal, and output the digital signal.

The signal processing module 240 may obtain the plurality of digital signals (e.g., digital signals 2351, 2352, 2353, 2354) transmitted by the plurality of sampling units. Digital signals may be separately output through different parallel lines or may share one line according to a specific transmission protocol.

The feedback analysis module 230 may obtain a plurality of digital signals (e.g., digital signals 2355, 2357, 2358) transmitted by the signal processing module 240. The feedback analysis module 230 may analyze each digital signal corresponding to a sub-band electric signal, output a plurality of feedback signals (e.g., feedback signals 1, 2, 3, . . . , N) and transmit each feedback signal to a corresponding acoustic-electric transducer. The corresponding acoustic-electric transducer may adjust its parameters based on the feedback signal.

The acoustic-electric transducer 211 in the signal processing device 2200 may be similar to the acoustic-electric transducer 211 in the signal processing device 2100. More detailed descriptions about the acoustic-electric transducer 211 in the signal processing device 2200 may be found elsewhere in the present disclosure (e.g., FIG. 21B and the descriptions thereof).

Figure 23:
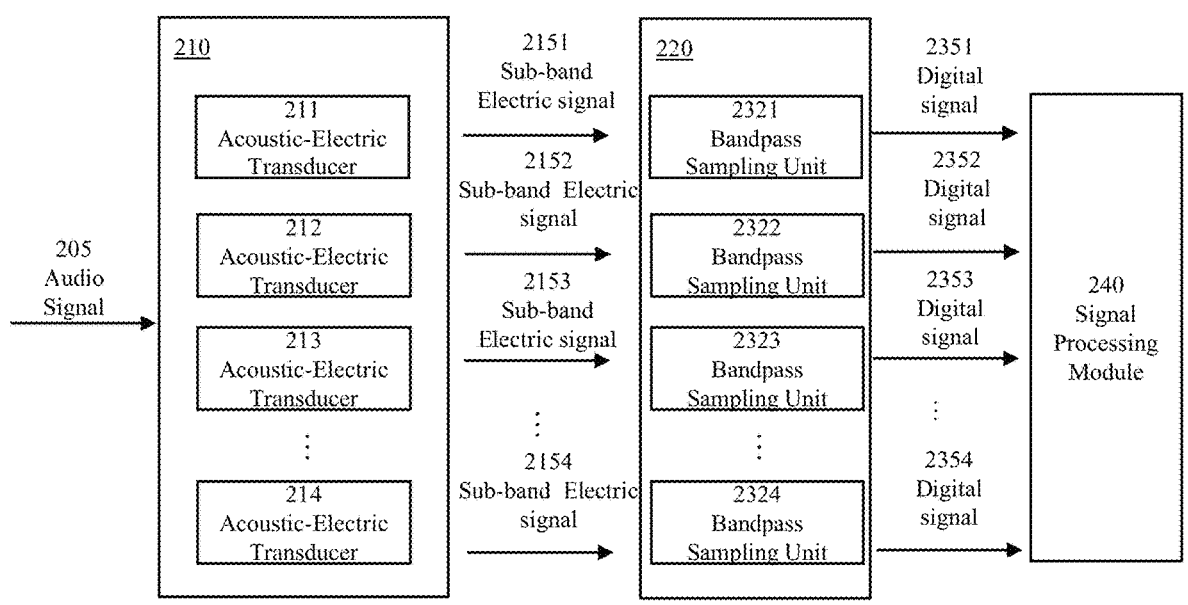
FIG. 23 is a schematic diagram of an exemplary signal processing device according to some embodiments of the present disclosure.

FIG. 23 is a schematic diagram of an exemplary signal processing device 2300 according to some embodiments of the present disclosure. The signal processing device 2300 may include an acoustic-electric transducing module 210, a plurality of bandpass sampling modules (e.g., bandpass sampling modules 2321, 2322, 2323, . . . 2324), and a signal processing module 240.

The acoustic-electric transducing module 210 may include a plurality of acoustic-electric transducers (e.g., acoustic-electric transducers 211, 212, 213, . . . 214).

As shown in FIG. 23, the acoustic-electric transducing module 210 may obtain an audio signal 205 and output a plurality of sub-band electric signals. Each of the plurality of acoustic-electric transducer may convert the audio signal 205 into a corresponding sub-band electric signal output the corresponding sub-band electric signal. Each of the plurality of bandpass sampling modules may sample a corresponding sub-band electric signal, convert the sub-band electric signal into a digital signal, and output the digital signal. The signal processing module 240 may obtain a plurality of digital signals transmitted by the plurality of bandpass sampling modules.

Figure 24:
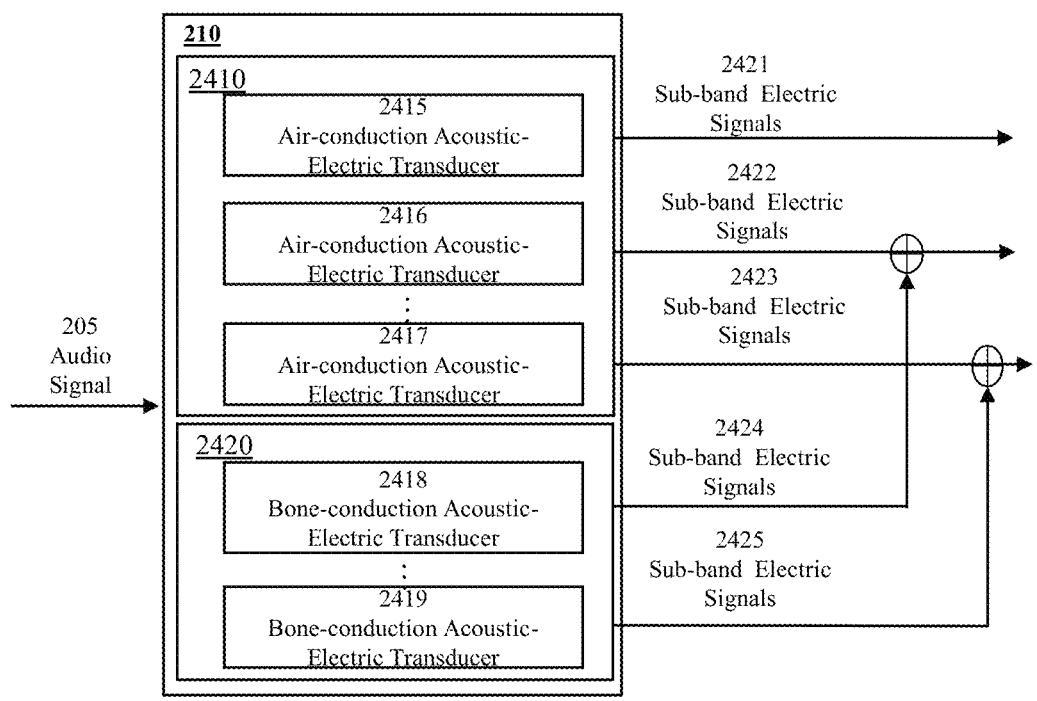
FIG. 24 is a schematic diagram of an exemplary signal processing device according to some embodiments of the present disclosure.

FIG. 24 is a schematic diagram of an exemplary signal processing device 2400 according to some embodiments of the present disclosure. The acoustic-electric transducing module 210 may include one or more air-conduction acoustic-electric transducer 2410 (e.g., air-conduction acoustic-electric transducer 2415, 2416, and 2417) and one or more bone-conduction acoustic-electric transducers 2420 (e.g., bone-conduction acoustic-electric transducer 2418, 2419). An air-conduction acoustic-electric transducer may decompose the audio signal detected to one or more sub-band electric signals. A bone-conduction acoustic-electric transducer may decompose the detected audio signal into one or more sub-band electric signals.

Air-conduction acoustic-electric transducers may detect the audio signal and output a plurality of sub-band electric signals. Each air-conduction acoustic-electric transducer may output a corresponding sub-band electric signal. For example, the air-conduction acoustic-electric transducer 2415, 2517, 2418 may detect the audio signal respectively, and correspondingly output sub-band electric signals 2421, 2422, 2423.

Bone-conduction acoustic-electric transducers may detect the audio signal and output a plurality of sub-band electric signals. Each bone-conduction acoustic-electric transducer may output a corresponding sub-band electric signal. For example, the bone-conduction acoustic-electric transducer 2418 and 2419 may detect the audio signal respectively, and correspondingly output the sub-band electric signals 2424 and 2415.

In some embodiments, at the same frequency band, the sub-band electric signal output by the bone-conduction acoustic-electric transducer may be used to enhance the signal-to-noise ratio (SNR) of the sub-band electric signals output by the air-conduction acoustic-electric transducer. For example, the sub-band electric signal 2422 generated by the air-conduction acoustic-electric transducer 2416 may superpose the sub-band electric signal 2424 generated by the bone-conduction acoustic-electric transducer 2418. The sub-band electric signal 2424 may have higher SNR with respect to the sub-band electric signal 2422. The sub-band electric signal 2423 output by the air-conduction acoustic-electric transducer 2417 may superpose the sub-band electric signal 2425 output by the bone-conduction acoustic-electric transducer 2419. The sub-band electric signal 2425 may have a higher SNR than that of the sub-band electric signal 2423.

In some embodiments, the air-conduction acoustic-electric transducer 2401 may be used to supplement a frequency band that cannot be covered by the sub-band electric signals output by the bone-conduction acoustic-electric transducer 2402.

Figure 25:
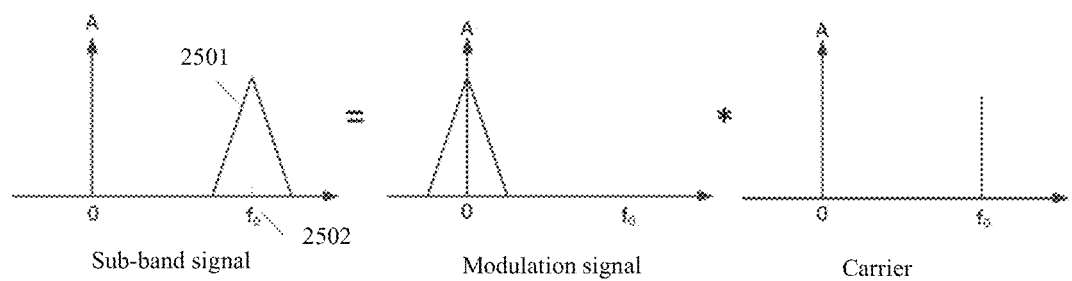
FIG. 25 is a schematic diagram illustrating exemplary signal modulation process according to some embodiments of the present disclosure.

FIG. 25 is a schematic diagram illustrating exemplary signal modulation process according to some embodiments of the present disclosure. As shown in FIG. 25, a sub-band electric signal may include a frequency domain envelope 2501.

Each sub-band electric signal may be considered as a signal (or referred as a modulation signal) having a frequency domain envelope (which is the same as the frequency domain envelope 2501) that is modulated by a corresponding center frequency signal as a carrier to the center frequency 2502. That is, the sub-band electric signal may include two parts. One part is a signal having a frequency domain envelope (which is same as the frequency domain envelope 2501) as a modulation signal, and the other part is a signal having a center frequency (which is the same as the center frequency 2502) as a carrier.

Main information of the sub-band electric signal is concentrated in the frequency domain envelope. Therefore, when the sub-band electric signal is sampled, it is necessary to ensure that the frequency domain envelope is effectively sampled, and a sampling frequency is not less than 2 times a bandwidth of the sub-band electric signal. After sampling, the second signal having a frequency (which is the same as the center frequency 2502) may be used as the carrier to restore the sub-band electric signal. Thus, the sub-band electric signal may be sampled using the bandpass sampling module. Specifically, the sampling frequency may be not less than 2 times the bandwidth and not more than 4 times the bandwidth. The sampling frequency $f_s$ is set according to Equation (34) as follows:

$$f_s = 2f_B(r_1/r_2) \tag{34}$$

where $f_B$ refers to the bandwidth of the sub-band electric signal, and $$r_1 = \frac{[f_0 + (f_B/2)]}{f_B}, \quad (35)$$

where $f_0$ refers to the center frequency of the sub-band electric signal, and $r_2$ is a largest integer less than $r_1$.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:
1. A device for processing an audio signal, comprising:
a first acoustic-electric transducer having a first frequency response and configured to:
  detect the audio signal; and
  generate a first sub-band signal according to the detected audio signal by the first acoustic-electric transducer; and
a second acoustic-electric transducer having a second frequency response, the second frequency response being different from the first frequency response, wherein the second acoustic-electric transducer is configured to:

detect the audio signal; and
generate a second sub-band signal according to the detected audio signal by the second acoustic-electric transducer;
wherein the first acoustic-electric transducer has a first frequency bandwidth, and the second acoustic-electric transducer has a second frequency bandwidth different from the first frequency bandwidth; and
when the second frequency bandwidth is larger than the first frequency bandwidth, a second center frequency of the second acoustic-electric transducer is higher than a first center frequency of the first acoustic-electric transducer.

2. The device of claim 1, wherein the first frequency response and the second frequency response intersect at a point which is near a half-power point of the first frequency response and a half-power point of the second frequency response.

3. The device of claim 1, further comprising:
a first sampling module connected to the first acoustic-electric transducer and configured to sample the first sub-band signal to generate a first sampled sub-band signal; and
a second sampling module connected to the second acoustic-electric transducer and configured to sample the second sub-band signal to generate a second sampled sub-band signal.

4. The device of claim 3, further comprising a feedback module configured to adjust at least one of the first acoustic-electric transducer or the second acoustic-electric transducer.

5. The device of claim 4, wherein the feedback module is configured to adjust the at least one of the first acoustic-electric transducer or the second acoustic-electric transducer according to at least one of the first sampled sub-band signal or the second sampled sub-band signal.

6. The device of claim 4, further comprising a processing module configured to respectively process the first sampled sub-band signal and the second sampled sub-band signal to generate a first processed sub-band signal and a second processed sub-band signal, wherein the feedback module is configured to adjust the at least one of the first acoustic-electric transducer or the second acoustic-electric transducer according to the first processed sub-band signal or the second processed sub-band signal.

7. The device of claim 1, wherein the first acoustic-electric transducer includes a sound sensitive component, configured to generate an electric signal according to the audio signal, and an acoustic channel component.

8. The device of claim 7, wherein:
the acoustic channel component includes a second-order component; and
the sound sensitive component includes a multi-order bandpass diaphragm.

9. The device of claim 1, wherein the first acoustic-electric transducer includes a first-order bandpass filter or a multi-order bandpass filter.

10. The device of claim 1, wherein the device includes at least one of:
no more than 10 first-order acoustic-electric transducers, wherein each first-order acoustic-electric transducer corresponds to a frequency band whose bandwidth is no larger than 20 kHz;
no more than 20 second-order acoustic-electric transducers, wherein each second-order acoustic-electric transducer corresponds to a frequency band whose bandwidth is no larger than 20 kHz;
no more than 30 third-order acoustic-electric transducers, wherein each third-order acoustic-electric transducer corresponds to a frequency band whose bandwidth is no larger than 20 kHz; or
no more than 40 fourth-order acoustic-electric transducers, wherein each fourth-order acoustic-electric transducer corresponds to a frequency band whose bandwidth is no larger than 20 kHz.

11. The device of claim 1, wherein the device includes at least one of:
no more than 8 first-order acoustic-electric transducers, wherein each first-order acoustic-electric transducer corresponds to a frequency band whose bandwidth is no larger than 8 kHz;
no more than 13 second-order acoustic-electric transducers, wherein each second-order acoustic-electric transducer corresponds to a frequency band whose bandwidth is no larger than 8 kHz;
no more than 19 third-order acoustic-electric transducers, wherein each third-order acoustic-electric transducer corresponds to a frequency band whose bandwidth is no larger than 8 kHz; or
no more than 26 fourth-order acoustic-electric transducers, wherein each fourth-order acoustic-electric transducer corresponds to a frequency band whose bandwidth is no larger than 8 kHz.

12. The device of claim 1, wherein the first acoustic-electric transducer is a high-order wideband acoustic-electric transducer, and the second acoustic-electric transducer is a high-order narrow-band acoustic-electric transducer.

13. The device of claim 12, wherein the high-order wideband acoustic-electric transducer includes a plurality of underdamping sound sensitive components connected in parallel.

14. The device of claim 13, wherein the plurality of underdamping sound sensitive components include a first underdamping sound sensitive component having a fourth frequency response, a second underdamping sound sensitive component having a fifth frequency response, and a third underdamping sound sensitive component having a sixth frequency response, wherein:
a fifth center frequency of the second underdamping sound sensitive component is higher than a fourth center frequency of the first underdamping sound sensitive, and a sixth center frequency of the third underdamping sound sensitive component is higher than the fifth center frequency of the second underdamping sound sensitive, and
the fourth frequency response and the fifth frequency response intersect at a point which is near a half-power point of the fourth frequency response and a half-power point of the fifth frequency response.

15. The device of claim 13, wherein the plurality of underdamping sound sensitive components include a first underdamping sound sensitive component having a fourth frequency response, and a second underdamping sound sensitive component having a fifth frequency response, wherein:
the fourth frequency response and the fifth frequency response intersect at a point which is near a half-power point of the fourth frequency response and a half-power point of the fifth frequency response.

16. The device of claim 12, wherein the high-order narrow-band acoustic-electric transducer includes a plurality of underdamping sound sensitive components connected in series.

17. The device of claim 1, wherein
the first acoustic-electric transducer includes a first acoustic channel component; and
the second acoustic-electric transducer includes a second acoustic channel component.

18. The device of claim 17, wherein the first acoustic channel component of the first acoustic-electric transducer and the second acoustic channel component of the second acoustic-electric transducer include different chamber-pipe structures, such that the first frequency response being different from the second frequency response.

19. A method implemented on a computing device having at least one storage device storing a set of instructions for processing an audio signal, and at least one processor in communication with the at least one storage device, the method comprising:
    detecting the audio signal;
    generating a first sub-band signal according to the detected audio signal; and
    generating a second sub-band signal according to the detected audio signal;
    wherein the first sub-band signal and the second sub-band signal have different frequency bandwidths and different center frequencies, and
    when the frequency bandwidth of the second sub-band signal is larger than the frequency bandwidth of the first sub-band signal, a second center frequency of the second sub-band signal is higher than a first center frequency of the first sub-band signal.

20. A non-transitory computer readable medium, comprising at least one set of instructions for processing an audio signal, wherein when executed by at least one processor of an electronic terminal, the at least one set of instructions directs the at least one processor to perform acts of:
    detecting the audio signal;
    generating a first sub-band signal according to the detected audio signal; and
    generating a second sub-band signal according to the detected audio signal;
    wherein the first sub-band signal and the second sub-band signal have different frequency bandwidths and different center frequencies, and
    when the frequency bandwidth of the second sub-band signal is larger than the frequency bandwidth of the first sub-band signal, a second center frequency of the second sub-band signal is higher than a first center frequency of the first sub-band signal.

* * * * *